US009892729B2

(12) United States Patent
Yun et al.

(10) Patent No.: US 9,892,729 B2
(45) Date of Patent: Feb. 13, 2018

(54) METHOD AND APPARATUS FOR CONTROLLING VOICE ACTIVATION

(71) Applicant: QUALCOMM Incorporated, San Diego, CA (US)

(72) Inventors: Sungrack Yun, Seoul (KR); Minho Jin, Gyeonggi-do (KR); Taesu Kim, Seongnam (KR); Kyu Woong Hwang, Taejon (KR)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 14/092,527

(22) Filed: Nov. 27, 2013

(65) Prior Publication Data
US 2014/0334645 A1 Nov. 13, 2014

Related U.S. Application Data

(60) Provisional application No. 61/820,526, filed on May 7, 2013, provisional application No. 61/864,490, filed on Aug. 9, 2013.

(51) Int. Cl.
G10L 21/00 (2013.01)
G10L 25/00 (2013.01)
G10L 15/00 (2013.01)
G10L 15/16 (2006.01)
G10L 15/08 (2006.01)
(Continued)

(52) U.S. Cl.
CPC ............. G10L 15/08 (2013.01); G06F 1/325 (2013.01); G06F 1/3206 (2013.01); G10L 15/22 (2013.01); H04M 1/72522 (2013.01);
G06F 3/167 (2013.01); G10L 25/78 (2013.01); G10L 2015/088 (2013.01); H04M 2250/74 (2013.01);
(Continued)

(58) Field of Classification Search
CPC ......... G10L 15/22; G10L 15/08; G10L 25/48; G10L 2015/088; G10L 17/22; G10L 25/78; G10L 2015/228; G10L 15/183; G10L 15/222; G06F 3/167; G06F 1/3206; G06F 1/325
See application file for complete search history.

(56) References Cited

U.S. PATENT DOCUMENTS 5,983,186 A    11/1999  Miyazawa et al.
6,397,186 B1 *  5/2002  Bush ............... G10L 15/26
                                          704/272

(Continued)

FOREIGN PATENT DOCUMENTS

WO    0146946 A1    6/2001

OTHER PUBLICATIONS

International Search Report and Written Opinion for International Application No. PCT/US2014/035241, ISA/EPO, dated Jul. 21, 2014, 10 pages.

Primary Examiner — Michael Ortiz Sanchez
(74) Attorney, Agent, or Firm — Toler Law Group, P.C.

(57) ABSTRACT

A method for controlling voice activation by a target keyword in a mobile device is disclosed. The method includes receiving an input sound stream. When the input sound stream indicates speech, the voice activation unit is activated to detect the target keyword and at least one sound feature is extracted from the input sound stream. Further, the method includes deactivating the voice activation unit when the at least one sound feature indicates a non-target keyword.

30 Claims, 15 Drawing Sheets

(51) Int. Cl.
  *H04M 1/725* (2006.01)
  *G06F 1/32* (2006.01)
  *G10L 15/22* (2006.01)
  *H04W 52/02* (2009.01)
  *G10L 25/78* (2013.01)
  *G06F 3/16* (2006.01)

(52) U.S. Cl.
  CPC .......... *H04W 52/0254* (2013.01); *Y02B 60/50* (2013.01)

(56) References Cited

U.S. PATENT DOCUMENTS

| | | |
|---|---|---|
| 6,718,307 B1 | 4/2004 | Buil et al. |
| 8,326,328 B2 | 12/2012 | Lebeau et al. |
| 8,370,144 B2 | 2/2013 | Gierach et al. |
| 8,417,518 B2 | 4/2013 | Iwasawa |
| 2001/0016814 A1* | 8/2001 | Hauenstein ............ G10L 15/08 704/231 |
| 2004/0215454 A1* | 10/2004 | Kobayashi ............ G10L 15/142 704/231 |
| 2006/0190259 A1* | 8/2006 | Jeong ...................... G10L 15/08 704/256 |
| 2007/0281761 A1 | 12/2007 | Kim |
| 2012/0215537 A1 | 8/2012 | Igarashi |
| 2013/0339028 A1* | 12/2013 | Rosner ................. G10L 15/222 704/275 |
| 2014/0012586 A1* | 1/2014 | Rubin .................... G10L 25/51 704/273 |
| 2014/0053209 A1* | 2/2014 | Young ............. H04N 21/42203 725/53 |
| 2014/0237277 A1* | 8/2014 | Mallinson ............ G06F 1/3206 713/323 |
| 2014/0281628 A1* | 9/2014 | Nigam .................. G06F 1/3206 713/323 |
| 2014/0334645 A1* | 11/2014 | Yun ........................ G10L 15/08 381/110 |
| 2014/0337030 A1* | 11/2014 | Lee ........................ G10L 15/08 704/251 |
| 2014/0337031 A1* | 11/2014 | Kim ........................ G06F 3/167 704/256.5 |
| 2015/0081296 A1* | 3/2015 | Lee ........................ G10L 15/20 704/239 |
| 2016/0189706 A1* | 6/2016 | Zopf .................... G10L 15/063 713/320 |

* cited by examiner

METHOD AND APPARATUS FOR CONTROLLING VOICE ACTIVATION

CLAIM OF PRIORITY

The present application claims priority from U.S. Provisional Patent Application No. 61/820,526, filed May 7, 2013, entitled "METHOD AND APPARATUS FOR CONTROLLING VOICE ACTIVATION," and U.S. Provisional Patent Application No. 61/864,490, filed Aug. 9, 2013, entitled "METHOD AND APPARATUS FOR CONTROLLING VOICE ACTIVATION," both of which are incorporated by reference in their entirety.

TECHNICAL FIELD

The present disclosure relates generally to voice activation and, more particularly, to controlling voice activation in a mobile device.

BACKGROUND

In recent years, the use of mobile devices such as smartphones, personal digital assistants (PDAs), tablet computers, and laptop computers has become widespread. These devices allow users to perform a variety of functions such as browsing the Internet, taking pictures or videos, making phone or video calls, etc. In addition, such devices often provide applications with various functionalities.

Further, many such mobile devices may include one or more microphones that are used to capture audio signals. Some of these devices may allow audio signals to be captured and processed for voice activation. Using such voice activation feature, an application may be activated by inputting a voice keyword in the mobile devices.

In order to take full advantage of such voice activation feature, a mobile device typically needs to be configured to continuously monitor and process environmental sounds for a potential keyword. However, the continuous operation of the voice activation feature may deplete the limited power resources of the mobile device.

SUMMARY

The present disclosure provides methods, systems and devices for controlling voice activation in a mobile device. In these methods, systems and devices, upon receiving an input sound stream, a voice activation unit may be activated to detect a target keyword when the input sound stream indicates speech. Further, at least one sound feature may be extracted from the input sound stream, and the voice activation unit may be deactivated when the at least one sound feature indicates a non-target keyword.

According to one aspect of the present disclosure, a method for controlling voice activation by a target keyword in a mobile device is disclosed. In the method, an input sound stream is received, and a voice activation unit is activated to detect the target keyword when the input sound stream indicates speech. At least one sound feature is extracted from the input sound stream, and the voice activation unit is deactivated when the at least one sound feature indicates a non-target keyword. This disclosure also describes a device, a system, a combination of means, and a computer-readable medium relating to this method.

According to another aspect of present disclosure, a mobile device for controlling voice activation by a target keyword is disclosed. The mobile device includes a receiver, a speech detector, a voice activation unit, and a voice activation control unit. The receiver is configured to receive an input sound stream. Further, the speech detector is configured to activate a voice activation unit to detect the target keyword when the input sound stream indicates speech. The voice activation unit is configured to extract at least one sound feature from the input sound stream and the voice activation control unit is configured to deactivate the voice activation unit when the at least one sound feature indicates a non-target keyword.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as to not unnecessarily obscure aspects of the various embodiments.

Figure 1:
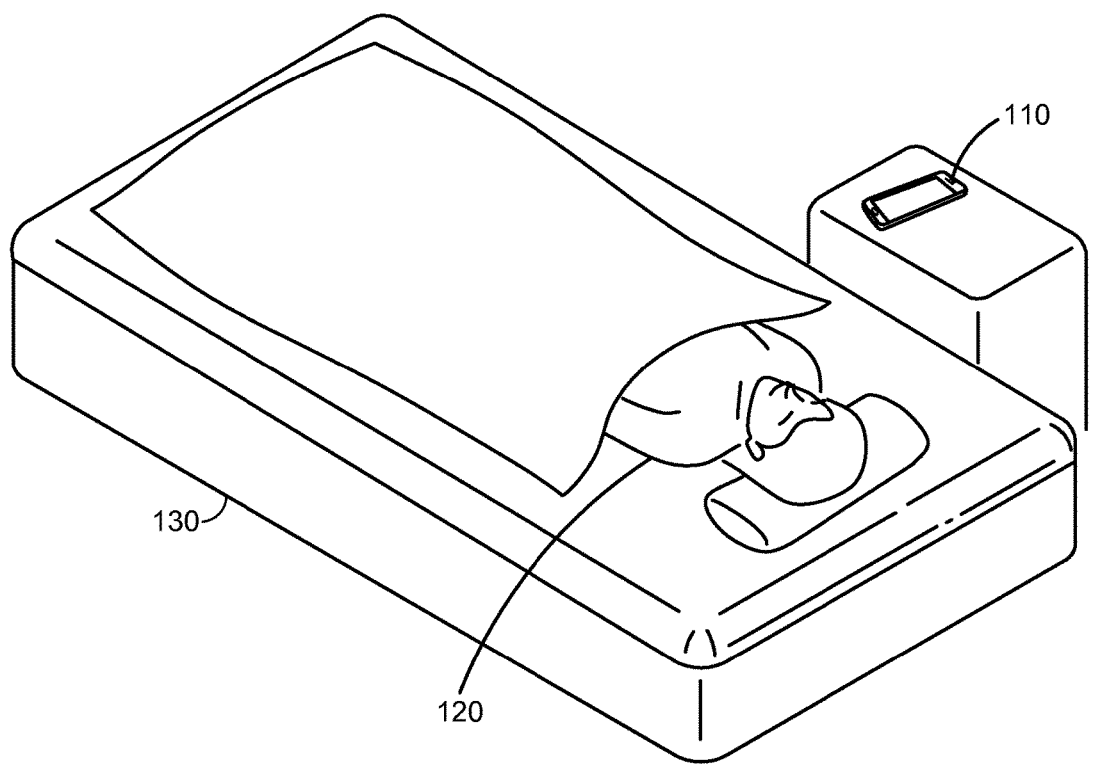
FIG. 1 illustrates a mobile device configured to capture an input sound and perform a voice activated function when a target keyword is detected in the input sound, according to one embodiment of the present disclosure.

FIG. 1 illustrates a mobile device 110 configured to capture an input sound stream and perform a voice activated function when a target keyword is detected in the input sound stream, according to some embodiments of the present disclosure. In the illustrated embodiment, a user 120 may speak a target keyword while lying on a bed 130 and the mobile device 110 receives the spoken sound. In response to the spoken sound, the mobile device 110 activates a voice activation unit to detect the target keyword in the received input sound stream. The voice activation unit extracts at least one sound feature from the input sound stream. When the at least one sound feature indicates a non-target keyword, the mobile device 110 deactivates the voice activation unit.

The mobile device 110 may be any suitable device such as a cellular phone, a smartphone, a laptop computer or a tablet computer equipped with sound capturing capability, e.g., a microphone to allow detection of a target keyword for activating a voice activated function. For example, before falling asleep, the user 120 may verbally set an alarm clock in the mobile device 110. In this case, the user 120 may speak a target keyword "set alarm" to the mobile device 110 which activates an alarm clock application. The mobile device 110 then receives the sound and determines whether the received sound (i.e., input sound stream) exceeds predetermined threshold sound intensity. Further, the mobile device 110 determines whether the received sound is speech by using a sound classification method (e.g., Support Vector Machine technique) when the received sound exceeds the predetermined threshold sound intensity.

If the mobile device 110 determines that the received sound is speech that exceeds predetermined threshold sound intensity, the mobile device 110 activates the voice activation unit to determine whether the received voice sound includes the target keyword, which may be previously stored in a keyword database of the mobile device 110. Upon determining that the received sound includes the target keyword, the mobile device 110 activates an alarm application associated with the target keyword and allows the user 120 to set the alarm clock to a desired time. As used herein, the term "sound stream" refers to a sequence of one or more sound signals or sound data. Further, the term "keyword" refers to any digital or analog representation of one or more words or sound that can be used to activate a function or application in a mobile device, and may include any number of words in a spoken form or a recorded form of human speech or conversation. As used herein, the term "voice activation" means activating at least one function or application of a mobile device by detecting a predetermined target keyword in a captured sound.

To allow voice activation, the mobile device 110 may be configured to continuously monitor an input sound stream for determining whether the captured sound includes the target keyword until the mobile device 110 detects the target keyword from the captured sound. Operating the mobile device 110 in such a manner typically results in an increased use of power, thereby shortening the battery life. Accordingly, in order to conserve power, power consumption of the mobile device 110 may be reduced by controlling the voice activation, as described in some embodiments below.

In FIG. 1, once the voice activation unit of the mobile device 110 is activated, it may continue to operate in an active mode until the voice activation unit detects the target keyword. In this case, since the user 120 is sleeping, the input sound stream to the mobile device 110 will not have any speech that includes the target keyword of the user 120. Thus, the mobile device 110 is configured to automatically deactivate the voice activation unit of the mobile device 110 as described in more detail below. By monitoring the input sound stream and automatically deactivating the voice activation unit as needed, the mobile device 110 may conserve power and improve battery life. The deactivated voice activation unit may be reactivated when the mobile device 110 determines that a subsequent received sound is speech.

As described above, the voice activation unit of the mobile device 110 may be activated when the mobile device 110 determines that the received sound is speech that exceeds predetermined threshold sound intensity. In some cases, the voice activation unit of the mobile device 110 may be activated due to noise or malfunction without any speech input. In such an event, the mobile device 110 is configured to detect the activation and deactivate the voice activation unit to reduce power consumption. For example, if the voice activation unit of the mobile device 110 is activated accidentally due to noise or malfunction while the user 120 is sleeping as illustrated in FIG. 1, the mobile device 110 may deactivate the voice activation unit based on a subsequent received sound. As used herein, the term "activation" refers to enabling or turning on a device or a unit from an off state or an inactive state (e.g., an idle state) to allow the device or the unit to perform one or more associated functions. Further, the term "deactivation" refers to disabling or turning off a device or a unit from an activation state (e.g., "on" state). The term "reactivation" refers to enabling or turning on a device or a unit after the device or the unit has been deactivated.

Figure 2:
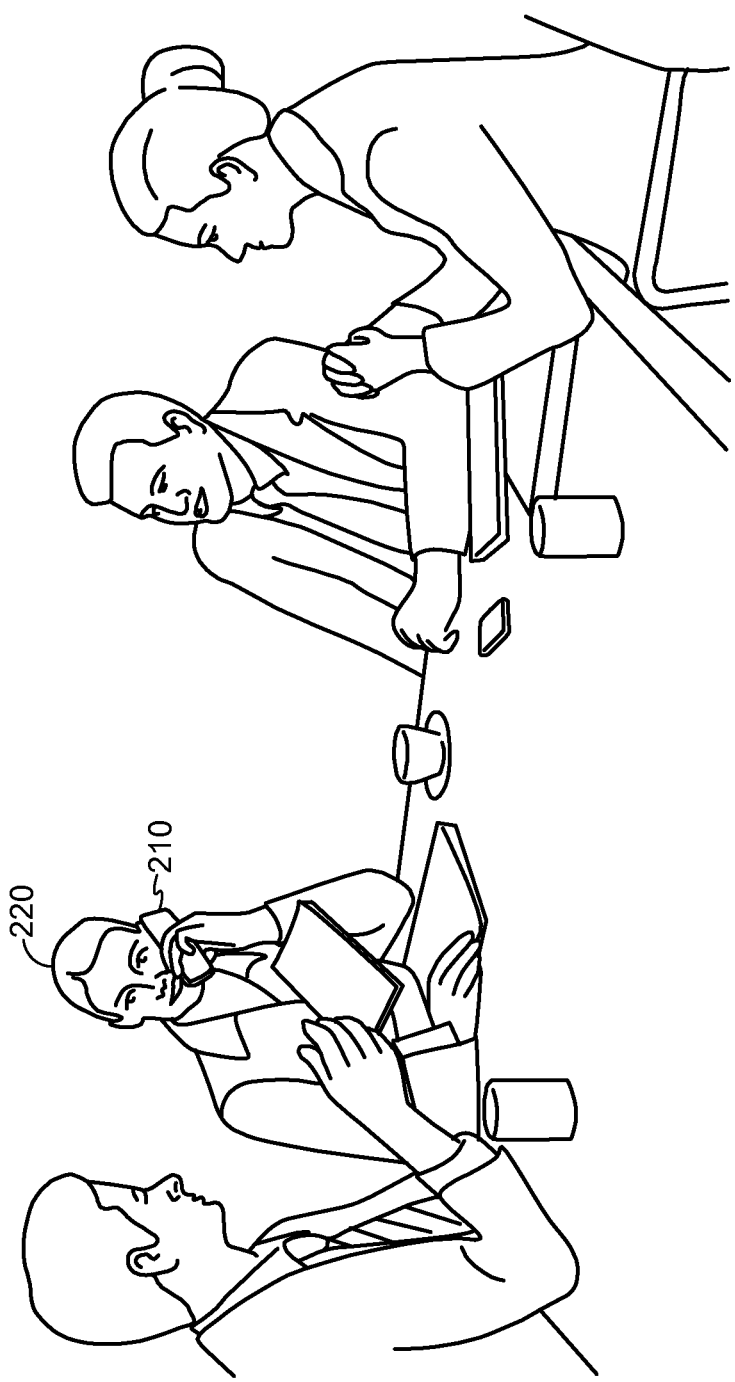
FIG. 2 illustrates a user in a meeting in which a mobile device of the user is configured to deactivate a voice activation unit when conversations during the meeting do not include a target keyword, according to one embodiment of the present disclosure.

FIG. 2 illustrates a user 220 in a meeting in which a mobile device 210 of the user 220 is configured to deactivate a voice activation unit when conversations during the meeting do not include a target keyword, according to one embodiment of the present disclosure. In the illustrated scenario, the mobile device 210 is configured to capture an input sound stream and perform a voice activated function when a target keyword is detected in the input sound stream.

In one embodiment, the mobile device 210 is configured to receive an input sound stream through a sound sensor such as a microphone, and determine whether the received sound is speech. If the mobile device 210 determines that the received sound is speech, the mobile device 210 activates the voice activation unit to detect the target keyword in the received input sound stream.

In the meeting scenario of FIG. 2, the mobile device 210 may receive conversational sound of the meeting and determine that the conversation is speech. Based on the detected speech, the voice activation unit of the mobile device 210 is then activated for determining whether the received sound includes a predetermined target keyword. If the received conversation sound does not include the target keyword for a predetermined time period, it may be assumed that there is a very low probability that the subsequent conversation sound would include the target keyword. Thus, when the mobile device 210 determines that the received sound does not include the target keyword for the predetermined time period, it may deactivate the voice activation unit to terminate processing of the conversational sound including a subsequent sound having a similar context.

If the meeting is over and the conversational sound is no longer received, the mobile device 210 may reactivate the voice activation unit to detect the target keyword. For example, the mobile device 210 may detect when the conversation is finished by monitoring the input sound stream being received. In one embodiment, the mobile device 210 may reactivate the voice activation unit when a subsequent conversational sound is detected and there is a predetermined duration of silence between the previously received conversational sound and the subsequent conversational sound. As used herein, the term "silence" means a state in which a sound below a predetermined threshold sound intensity is received. In another embodiment, the mobile device 210 may reactivate the voice activation unit when a subsequent sound is detected to be speech and a change of context is detected between the previous sound and the subsequent sound.

Figure 3:
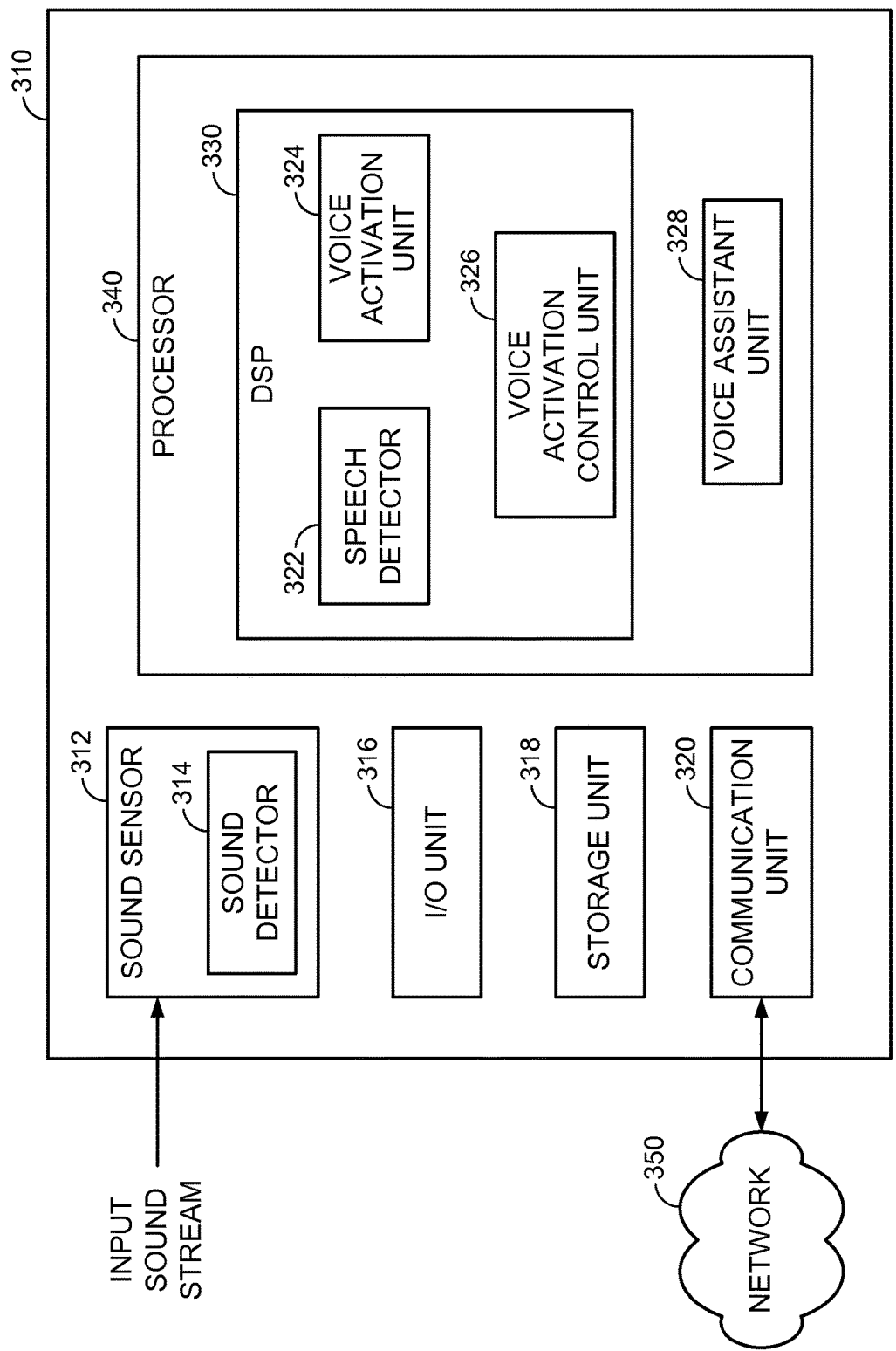
FIG. 3 illustrates a block diagram of a mobile device configured to detect a target keyword in an input sound stream for activating a function in the mobile device according to one embodiment of the present disclosure.

FIG. 3 depicts a block diagram of a mobile device 310 configured to detect a target keyword in an input sound stream for activating a function in the mobile device 310 according to one embodiment of the present disclosure. The mobile device 310 includes a sound sensor 312, an input/output (I/O) unit 316, a storage unit 318, a communication unit 320, and a processor 340. Similarly to the mobile devices 110 and 210, the mobile device 310 may be any suitable devices equipped with a sound capturing and processing capability such as a cellular phone, a smartphone, a personal computer, a laptop computer, a tablet computer, a smart television, a gaming device, a multimedia player, etc.

The processor 340 includes a digital signal processor (DSP) 330 and a voice assistant unit 328, and may be an application processor or a central processing unit (CPU) for managing and operating the mobile device 310. The DSP 330 includes a speech detector 322, a voice activation unit 324, and a voice activation control unit 326. In one embodiment, the DSP 330 is a low power processor for reducing power consumption in processing sound streams. In this configuration, the voice activation unit 324 in the DSP 330 is configured to activate the voice assistant unit 328 when the target keyword is detected in an input sound stream. Although the voice activation unit 324 is configured to activate the voice assistant unit 328 in the illustrated embodiment, it may also activate any functions or applications that may be associated with a target keyword.

The sound sensor 312 may be configured to receive an input sound stream and provide it to the speech detector 322 in the DSP 330. The sound sensor 312 may include one or more microphones or any other types of sound sensors that can be used to receive, capture, sense, and/or detect a sound input stream to the mobile device 310. In addition, the sound sensor 312 may employ any suitable software and/or hardware for performing such functions.

In one embodiment, the sound sensor 312 may be configured to receive the input sound stream periodically according to a duty cycle. The sound sensor 312 may further include a sound detector 314 to determine whether the received portion of the input sound stream exceeds a predetermined threshold sound intensity. When the received portion of the input sound stream exceeds the threshold sound intensity, the sound detector 314 of the sound sensor 312 activates the speech detector 322 and provides the received portion to the speech detector 322 in the DSP 330. Alternatively, without determining whether the received portion exceeds the threshold sound intensity, the sound sensor 312 may receive a portion of the input sound stream periodically and activate the speech detector 322 to provide the received portion to the speech detector 322. It may be appreciated that the sound detector 314 may exist independently outside of the sound sensor 312 or may be included in other unit such as the speech detector 322.

For use in detecting the target keyword, the storage unit 318 stores the target keyword and information associated with a plurality of portions of the target keyword. In one embodiment, the target keyword may be divided into a plurality of basic sound units such as phones, phonemes, or subunits thereof, and the plurality of portions representing the target keyword may be generated based on the basic sound units. In some embodiments, the detection of the target keyword may be performed using a temporal pattern recognition method including a Markov chain model such as a hidden Markov model (HMM), a semi-Markov model (SMM), or a combination thereof. In such a case, each portion of the target keyword may be then associated with a state under HMM or SMM. The state information may include an entry state among the states for the target keyword and transition information from each of the states to a next state including itself. The storage unit 318 may be implemented using any suitable storage or memory devices such as a RAM (Random Access Memory), a ROM (Read-Only Memory), an EEPROM (Electrically Erasable Programmable Read-Only Memory), a flash memory, a solid state drive (SSD), or the like.

The speech detector 322 in the DSP 330, when activated, receives the portion of the input sound stream from the sound sensor 312. In one embodiment, the speech detector 322 extracts a plurality of sound features from the received portion and determines whether the extracted sound features indicate sound of interest such as speech by using any suitable sound classification method such as a Gaussian mixture model (GMM) based classifier, a HMM, a neural network, a graphical model, and a Support Vector Machine (SVM). As used herein, the term "sound feature" refers to any information or data describing or representing a sound of a specified duration and may include a frequency or a power component extracted from the sound, a sound class identifier representing a classification of the sound, and/or any other information or data extracted from the sound.

If the received portion is determined to be sound of interest, the speech detector 322 activates the voice activation unit 324 and the received portion and the remaining portion of the input sound stream are provided to the voice activation unit 324. In some other embodiments, the speech detector 322 may be omitted in the DSP 330. In this case, when the received portion exceeds the threshold sound intensity, the sound sensor 312 activates the voice activation unit 324 and provides the received portion and the remaining portion of the input sound stream directly to the voice activation unit 324.

The voice activation unit 324, when activated, is configured to continuously receive the input sound stream and detect the target keyword from the input sound stream. As the input sound stream is received, the voice activation unit 324 may sequentially extract a plurality of sound features from the input sound stream. In the case of using HMM for the detection of the target keyword, the voice activation unit 324 may obtain the state information including the plurality of states, the entry state, and transition information for the target keyword from the storage unit 318. For each sound feature, an observation score may be determined for each of the states by using any suitable probability model such as a GMM, a neural network, and a SVM. From the transition information, the voice activation unit 324 may obtain transition scores from each of the states to a next state in a plurality of state sequences that are possible for the target keyword.

After determining the observation scores and obtaining the transition scores, the voice activation unit 324 determines keyword scores for the possible state sequences. In one embodiment, if the greatest keyword score among the determined keyword scores exceeds a predetermined score threshold, the voice activation unit 324 detects the input sound stream as the target keyword. Upon detecting the target keyword, the voice activation unit 324 generates and transmits an activation signal to activate the voice assistant unit 328, which is associated with the target keyword.

The voice assistant unit 328 is activated in response to the activation signal from the voice activation unit 324. Once activated, the voice assistant unit 328 may perform a voice assistant function by outputting a message such as "MAY I HELP YOU?" on a touch display unit and/or through a speaker unit of the I/O unit 316. In response, a user may speak voice commands to activate various associated functions of the mobile device 310. For example, when a voice command for Internet search is received, the voice assistant unit 328 may recognize the voice command as a search command and perform a web search via the communication unit 320 through the network 350.

Once the voice activation unit 324 is activated, the voice activation control unit 326 in the DSP 330 determines whether the subsequently received input sound stream indicates a non-target keyword. As used herein, the term "non-target keyword" refers to all sounds other than a target keyword and may include silence, noise, and any word or sound that is not the target keyword. When it is determined that the target keyword is not included in the input sound stream, the voice activation control unit 326 may deactivate the voice activation unit 324. This prevents the voice activation unit 324 from continuously processing the input sound stream, thereby reducing power consumption of the mobile device 310.

Figure 4A:
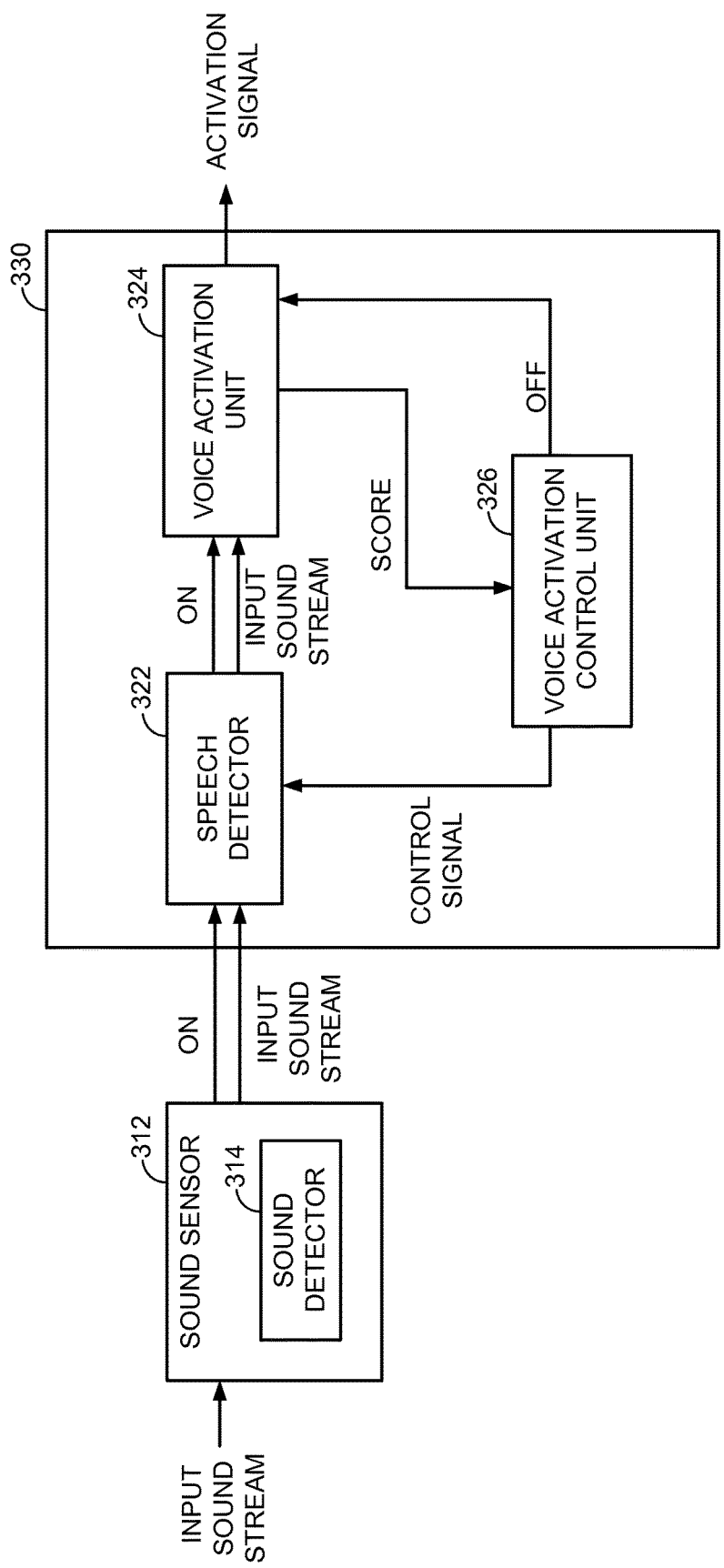
FIG. 4A illustrates a block diagram of the DSP configured to receive an activation signal and an input sound stream from the sound sensor and generate an activation signal for activating the voice assistant unit according to one embodiment of the present disclosure.

FIG. 4A illustrates a block diagram of the DSP 330 configured to receive an activation signal and an input sound stream from the sound sensor 312 and generate an activation signal for activating the voice assistant unit 328 according to one embodiment of the present disclosure. As described above with reference to FIG. 3, the sound sensor 312 receives an input sound stream and outputs an activation signal ("ON") to the speech detector 322 in the DSP 330 when the input sound stream is determined to be a sound exceeding the predetermined threshold sound intensity. Along with the activation signal, the sound sensor 312 may also provide the received input sound stream to the speech detector 322.

The activation signal from the sound sensor 312 activates the speech detector 322 to receive and process the input sound stream. In one embodiment, the speech detector 322 determines whether the received input sound stream is speech. If the received input sound stream is determined to be speech, the speech detector 322 generates an activation signal ("ON"), which is provided to the voice activation unit 324 along with the input sound stream.

In response to the activation signal from the speech detector 322, the voice activation unit 324 is turned on to receive and process the input sound stream from the speech detector 322. The voice activation unit 324 may segment the input sound stream into a plurality of frames and extract a sound feature from each of the segmented frames. In a particular embodiment, the voice activation unit 324 may determine a first metric that corresponds to a non-target keyword status of the extracted sound feature. For example, the voice activation unit 324 may determine a metric that corresponds to a likelihood that the extracted sound feature is associated with a non-target keyword. The voice activation unit 324 may compare the first metric to a second metric that is based on the input sound stream. For example, the second metric may correspond to a target keyword status of the extracted sound feature (e.g., a likelihood that the extracted sound feature is associated with a target keyword), or the second metric may correspond to an average non-target keyword status during a particular time period. The voice activation unit 324 may determine whether the extracted sound feature indicates a non-target keyword based on a result of the comparison. For example, the voice activation unit 324 may determine that the extracted sound feature indicates a non-target keyword if the first metric is greater than the second metric.

In another particular embodiment, based on the extracted sound feature, the voice activation unit 324 determines a keyword score indicating a probability that the received input sound stream includes a target keyword and a non-keyword score indicating a probability that the received input sound stream does not includes the target keyword. In one embodiment, if the keyword score exceeds a predetermined score threshold, the voice activation unit 324 detects the input sound stream as the target keyword. Upon detecting the target keyword, the voice activation unit 324 generates and transmits the activation signal to activate the voice assistant unit 328.

Once the voice activation unit 324 is activated, it continues to operate in an active state by processing the subsequent input sound stream. This may deplete the power resources of the mobile device 310 unnecessarily, particularly if the subsequent input sound stream does not include the target keyword. In such cases, the voice activation control unit 326 is used to turn off the voice activation unit 324.

In one embodiment, after determining the keyword score and non-keyword score, the voice activation unit 324 outputs the keyword score and non-keyword score to the voice activation control unit 326. Based on the keyword score and non-keyword score, the voice activation control unit 326 determines whether the input sound stream does not include the target keyword. For example, the voice activation control unit 326 may determine a confidence score indicating a difference between the keyword score and the non-keyword score, and detect that the input sound stream does not include the target keyword if the confidence score is less than a confidence score threshold. The voice activation control unit 326 may also determine a current non-keyword score and an overall non-keyword average score, and detect that the input sound stream does not include the target keyword if the current non-keyword score exceeds the overall non-keyword average score by more than an average non-keyword score threshold. If the voice activation control unit 326 determines that the input sound stream does not include the target keyword, the voice activation control unit 326 generates and transmits a deactivation signal ("OFF") to turn off the voice activation unit 324. As described above, the voice activation control unit 326 controls the voice activation unit 324 based on the scores determined by the voice activation unit 324. Thus, there is no need for the voice activation control unit 326 to use additional computing resources to calculate the scores and the voice activation control unit 326 can control the voice activation unit 324 efficiently.

In addition, the voice activation control unit 326 transmits a control signal to control the speech detector 322 to turn on the voice activation unit 324 when a subsequent input sound stream indicates speech. In response to the control signal, the speech detector 322 determines whether the subsequent input sound stream received after deactivating the voice activation unit 324 is speech. If the speech detector 322 determines that the subsequent input sound stream is not speech (e.g., silence), the speech detector 322 does not activate the voice activation unit 324. Thus, the voice activation unit 324 may remain deactivated without consuming power. On the other hand, if the speech detector 322 determines that the subsequent input sound stream is speech, the speech detector 322 may activate the voice activation unit 324 for detecting the target keyword in the subsequent input sound stream.

In one embodiment, the input sound stream received and processed by the voice activation unit 324 after activation may be a continuous conversation that does not include the target keyword (e.g., normal speech, ordinary conversation, etc.). In this case, the voice activation control unit 326 deactivates the voice activation unit 324 based on a keyword score and a non-keyword score as described above. Once the voice activation unit 324 has been deactivated, the sound sensor 312 may receive a subsequent input sound stream. When the subsequent input sound stream indicates a sound exceeding the threshold sound intensity, the sound detector 314 of the sound sensor 312 transmits an activation signal to the speech detector 322, which may in turn transmit an activation signal to the voice activation unit 324 if the subsequent input sound stream includes speech.

When the voice activation unit 324 is reactivated, the voice activation unit 324 may calculate a keyword score and a non-keyword score for each sound feature of the subsequent input sound stream. The keyword score and non-keyword score are then transmitted to the voice activation control unit 326. Based on the keyword and non-keyword scores, the voice activation control unit 326 may determine that the subsequent input sound stream does not include the target keyword and transmit a deactivation signal to the voice activation unit 324. In this manner, the voice activation unit 324 may be activated and deactivated repeatedly.

If the number of times that the voice activation control unit 326 makes the determination consecutively that the input sound stream does not include the target keyword exceeds a predetermined count, it may be assumed that there is a low possibility that the input sound stream currently being received includes the target keyword. According to one embodiment, the voice activation control unit 326 counts the number of determinations that the input sound stream does not include the target keyword based on the number of deactivation signals generated and transmitted to the voice activation unit 324. If the number of deactivation is greater than or equal to the predetermined count, the voice activation control unit 326 may transmit a control signal to the speech detector 322 to prevent activation of the voice activation unit 324 even when a subsequent input sound stream indicates speech. Thus, the voice activation control unit 326 may deactivate the voice activation unit 324 to terminate receiving and processing the input sound stream that is being received.

After the voice activation unit 324 has been deactivated based on the count of consecutive deactivations, it may be reactivated to receive and process a subsequent sound stream. In one embodiment, if the speech detector 322 has finished processing a previous conversation in the input sound stream and receives a new conversation, it may reactivate the voice activation unit 324 since there is a possibility that the newly received conversation includes the target keyword. For example, the speech detector 322 may detect that the previous conversation is finished when it detects a predetermined duration of silence between the previously received conversation and the subsequent conversation. Alternatively, the sound detector 314 in the sound sensor 312 may be configured to detect duration of silence for use in activating the voice activation unit 324.

In another embodiment, the speech detector 322 may reactivate the voice activation unit 324 when a change in the sound context of the input sound stream is detected after being deactivated based on the count of consecutive deactivations. The change in context refers to a change in sound environment such as changing from one sound environment to another. For example, when the mobile device 310 is moved from a car to a room, the environmental sounds received from the car and the room typically exhibit different sound characteristics that can be used to identify the context for each environment. The context information of the received sound can be determined by employing any suitable context determining method. For example, sound features of an input sound may be compared and matched with sound features in a database which is trained from a specific context. Thereafter, the context information of the received sound may be determined from context information associated with best matched sound features in the database. For reactivating the voice activation unit 324, the speech detector 322 may detect a change in sound context between the previous input sound and the subsequent input sound stream. It may be appreciated that any other unit (e.g., voice activation control unit 326) may detect a change in sound context instead of the speech detector 322.

Figure 4B:
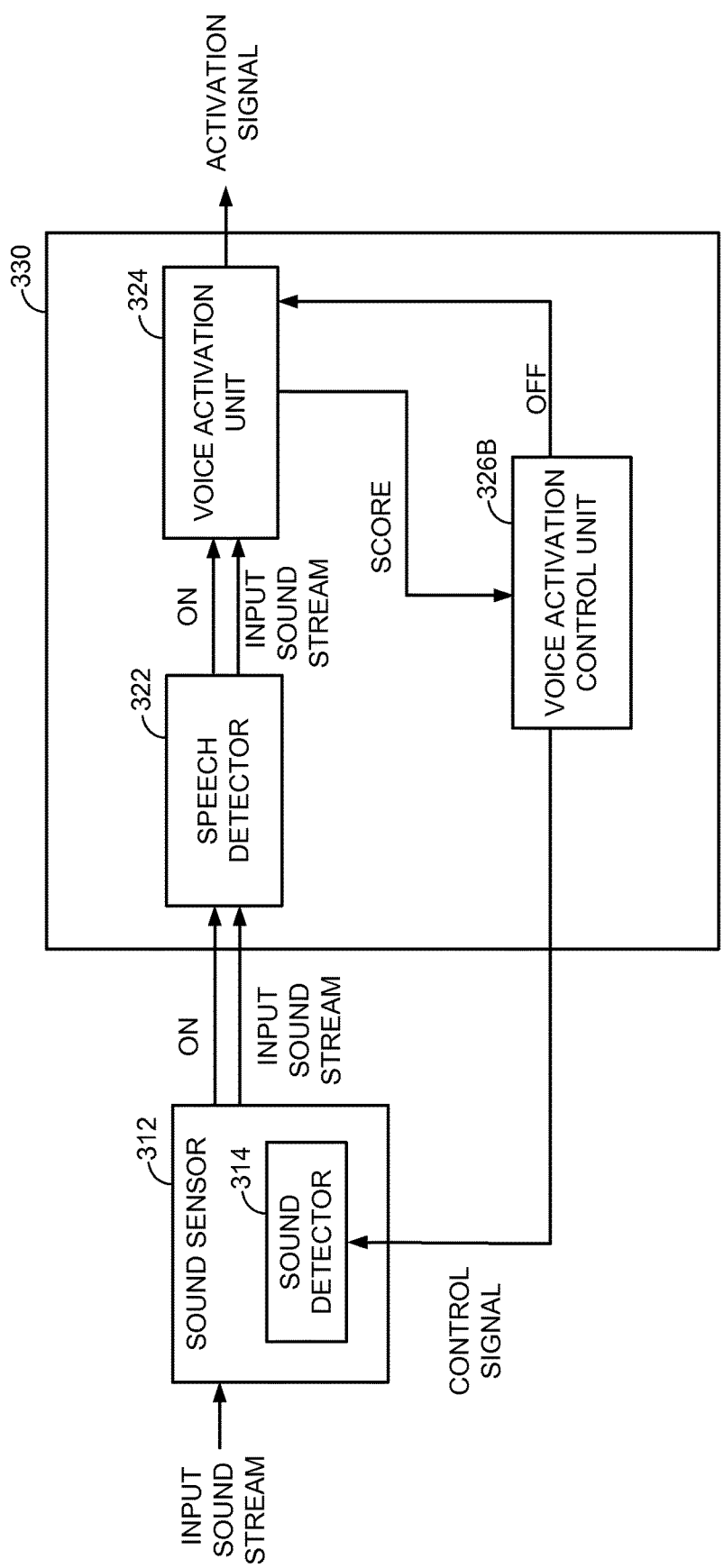
FIG. 4B illustrates a block diagram of the DSP configured to receive an activation signal and an input sound stream from the sound sensor and generate an activation signal for activating the voice assistant unit according to another embodiment of the present disclosure.

FIG. 4B illustrates a block diagram of the DSP 330 configured to receive an activation signal and an input sound stream from the sound sensor 312 and generate an activation signal for activating the voice assistant unit 328 according to another embodiment of the present disclosure. Similarly to FIG. 4A, the activation signal from the sound detector 314 of the sound sensor 312 activates the speech detector 322 to receive and process the input sound stream. If the received input sound stream is determined to be speech, the speech detector 322 generates an activation signal ("ON"), which is provided to the voice activation unit 324 along with the input sound stream. In response to the activation signal from the speech detector 322, the voice activation unit 324 generates a keyword score and a non-keyword score. Based on the scores determined by the voice activation unit 324, the voice activation control unit 326B controls the voice activation unit 324. Further, the voice activation control unit 326B counts the number of determinations that the input sound stream does not include the target keyword based on the number of deactivation signals generated and transmitted to the voice activation unit 324.

In this embodiment, if the number of deactivation is greater than or equal to a predetermined count, the voice activation control unit 326B may transmit a control signal to the sound detector 314 of the sound sensor 312 to deactivate the sound detector 314. For example, the sound detector 314 may be deactivated for a predetermined time period (e.g., 10 sec) when the sound detector 314 receives the control signal from the voice activation control unit 326B. In an alternative embodiment, if the number of times that the voice activation unit 324 is deactivated is greater than or equal to the predetermined count, the sound sensor 312 may be deactivated for a predetermined time period.

Figure 5:
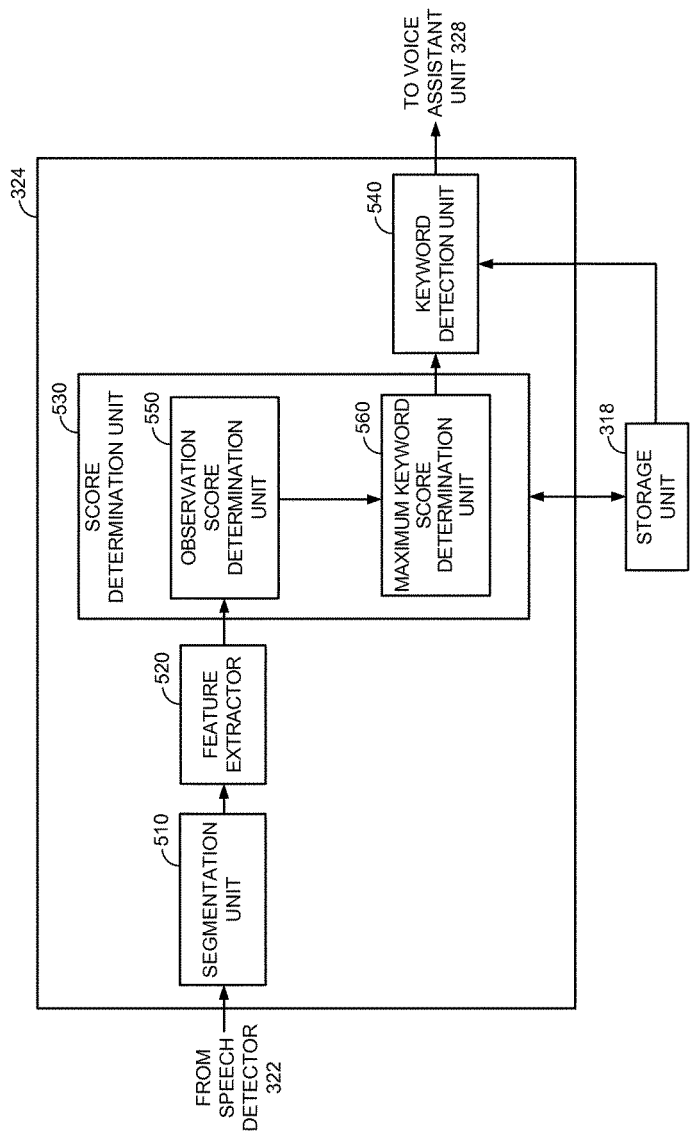
FIG. 5 illustrates a more detailed block diagram of the voice activation unit configured to receive an input sound stream and detect a target keyword in the input sound stream, according to one embodiment of the present disclosure.

FIG. 5 illustrates a more detailed block diagram of the voice activation unit 324 configured to receive an input sound stream and detect a target keyword in the input sound stream, according to one embodiment of the present disclosure. The voice activation unit 324 includes a segmentation unit 510, a feature extractor 520, a score determination unit 530, and a keyword detection unit 540. The score determination unit 530 includes an observation score determination unit 550 and a maximum keyword score determination unit 560.

The segmentation unit 510 receives the input sound stream from the speech detector 322 and segments the received input sound stream into a plurality of sequential frames of an equal time period. The feature extractor 520 sequentially receives the segmented frames from the segmentation unit 510 and extracts a sound feature from each of the frames. In one embodiment, the feature extractor 520 may extract the sound features from the frames using any suitable feature extraction method such as a Mel-Frequency Cepstral Coefficient (MFCC) method. For example, in the case of the MFCC method, MFCCs in an n-dimensional vector are calculated from each of the segmented frames and the vector is used as a sound feature.

In the score determination unit 530, the observation score determination unit 550 sequentially receives the sound features and receives state information for the target keyword from the storage unit 318. According to one embodiment, the state information for the target keyword may include a plurality of states associated with a plurality of portions of the target keyword and a probability model (e.g., probability function) such as GMM that is provided for each of the states. As described above, the target keyword may be divided into a plurality of basic units of sound and a plurality of portions representing the target keyword may be generated based on the basic units of sound. In some embodiments, the states for the target keyword may also include a non-keyword state (e.g., a "filler" state), which is not associated with any of the plurality of portions representing the target keyword. For example, in the case of a target keyword including a predetermined number of states, each of which corresponds to a basic unit of sound such as a phone, a non-keyword state may represent basic units of sound other than those that are included in the target keyword.

As each sound feature is received, the observation score determination unit 550 determines an observation score for each state of the target keyword based on the sound feature and the state information received from the storage unit 318. In one embodiment, the observation score for each of the states is determined for the received sound feature by calculating a probability value according to the probability model for the associated state. Each of the probability values may be used as the observation score for the associated state. A high observation score for a state indicates a high probability that the sound feature corresponds to a basic unit of sound for the state. The observation score determination unit 550 provides the observation scores for each of the received sound features to the maximum keyword score determination unit 560 for determining keyword scores for a plurality of state sequences, which are possible for the target keyword.

The maximum keyword score determination unit 560 receives the observation scores for each of the sound features and obtains the state information from the storage unit 318. The state information may include the plurality of states for the target keyword including the non-keyword state, an entry state among the states, and transition information from each of the states to a next state including itself. The entry state may represent a first state that the non-keyword state transitions to in each of possible state sequences for the target keyword.

The transition information in the state information includes a transition score from each of the states to a next state in each of the possible state sequences for the target keyword. The transition score may represent a probability value that each of the states transitions to the next state in each possible state sequence. The transition score also includes a transition score from the non-keyword state to the entry state.

Based on the received observation scores and the transition scores, the maximum keyword score determination unit 560 calculates a keyword score for each of the possible state sequences. In this case, a state sequence may start from a non-keyword state (i.e., a starting state) since the non-keyword state is assigned before the input sound stream is received. As such, the transition scores include a transition score from the non-keyword state to the entry state, and also include a transition score from the non-keyword state to itself in the state sequence. In this manner, as a set of observation scores for each sound feature is received from the observation score determination unit 550, the maximum keyword score determination unit 560 adds a next state to each state sequence and determines a keyword score for each of the updated state sequences. The maximum keyword score determination unit 560 then selects the greatest keyword score among the keyword scores for the updated state sequences. In one embodiment, the keyword scores may be calculated to determine the greatest keyword score by using any suitable method such as a Viterbi algorithm. After determining the greatest keyword score, the maximum keyword score determination unit 560 provides it to the keyword detection unit 540.

Upon receiving the greatest keyword score from the maximum keyword score determination unit 560, the keyword detection unit 540 detects the target keyword in the input sound stream based on the greatest keyword score. For example, the keyword detection unit 540 may receive a score threshold for detecting the target keyword from the storage unit 318 and detect the target keyword if the greatest keyword score is greater than the received score threshold. In this case, the score threshold may be set to a minimum keyword score for detecting the target keyword within a desired confidence level.

In some embodiments, the maximum keyword score determination unit 560 determines a non-keyword score for a non-keyword state sequence. The non-keyword score may be selected among the determined keyword scores for the possible state sequences and provided to the keyword detection unit 540. Once the target keyword is detected, the keyword detection unit 540 generates and provides an activation signal to turn on the voice assistant unit 328, which is associated with the target keyword.

Based on the keyword score (e.g., greatest keyword score) or the non-keyword score, the voice activation control unit 326 determines whether the input sound stream does not include the target keyword. In one embodiment, the voice activation control unit 326 may use both a keyword score and a non-keyword score to improve detection accuracy particularly when the input sound stream includes ambient sound such as noise that may affect keyword scores. In this embodiment, the voice activation control unit 326 may determine a confidence score indicating a difference between the keyword score and the non-keyword score. The confidence score is indicative of a probability of detecting the target keyword from the input sound stream. If the confidence score is high, it indicates a high probability of detecting the target keyword from the input sound stream. On the other hand, if the confidence score is low, it indicates a low probability of detecting the target keyword from the input sound stream. Thus, if the confidence score is less than the confidence score threshold, the voice activation control unit 326 determines that the input sound stream does not include the target keyword.

In another embodiment, the voice activation control unit 326 may analyze the input sound stream over a period time in determining that the input sound stream does not include the target keyword. For example, if a user speaks a target keyword "hey," the voice activation control unit 326 may initially determine that the received sound is not the target keyword when only the phones "he" is received. When the voice activation control unit 326 then receives the phone "y," it may determine that the received sound is the target keyword. Accordingly, to improve accuracy in determining whether the input sound stream does not include the target keyword, the voice activation control unit 326 determines whether the input sound stream does not include the target keyword based on an average value of non-keyword scores.

The voice activation control unit 326 may determine a current non-keyword score and an overall non-keyword average score, and determine a difference between the current non-keyword score and the overall non-keyword average score in one embodiment. The current non-keyword score may be a non-keyword score which is calculated from a most recently extracted sound feature. In another embodiment, the current non-keyword score may be an average score calculated from a plurality of recently extracted sound features. The overall non-keyword average score indicates an average score calculated from all of the extracted sound features over a specified period of time, which may be reset periodically. If the difference between the current non-keyword score and the overall non-keyword average score is greater than the average non-keyword score threshold, then the voice activation control unit 326 determines that the input sound stream does not include the target keyword. Alternatively, the voice activation control unit 326 may determine that the input sound stream does not include the target keyword if the confidence score is less than the confidence score threshold and the difference between the current non-keyword score and the overall non-keyword average score is greater than the average non-keyword score threshold.

Figure 6:
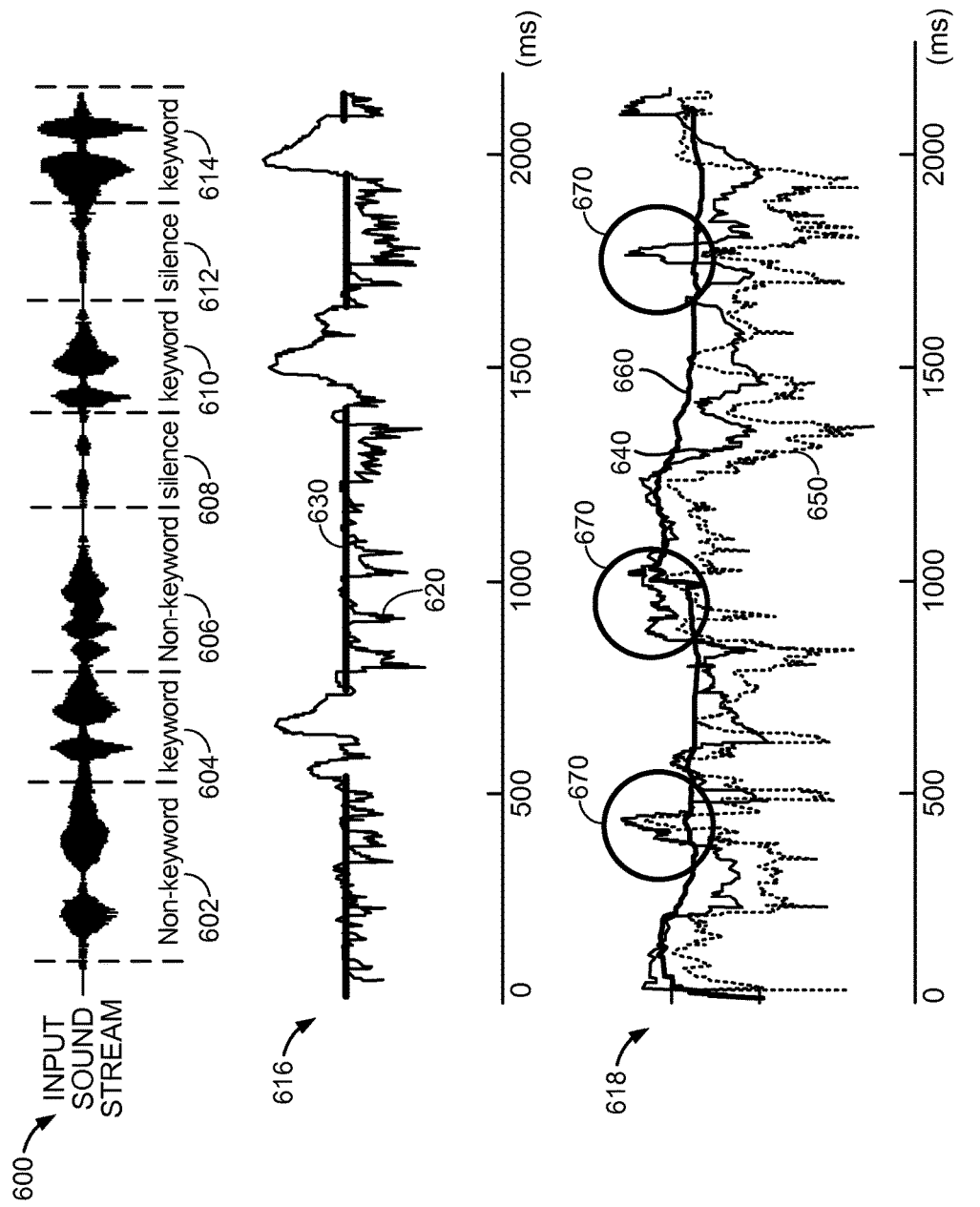
FIG. 6 illustrates exemplary graphs of a plurality of confidence scores, a plurality of current non-keyword scores, a plurality of current keyword scores, and a plurality of overall average non-keyword scores for an input sound stream, according to one embodiment of the present disclosure.

FIG. 6 illustrates exemplary graphs 616 and 618 of a plurality of confidence scores 620, a plurality of current non-keyword scores 640, a plurality of current keyword scores 650, and a plurality of overall average non-keyword scores 660 for an input sound stream 600, according to one embodiment. The received input sound stream 600 includes a plurality of portions 602 to 614. As shown, the input sound stream 600 includes two non-keyword portions 602 and 606, three keyword portions 604, 610, and 614, and two silence portions 608 and 612. As used herein, the term "non-keyword" refers to all sounds other than a target keyword, silence, and noise.

The score graph 616 illustrates the confidence scores 620 for the input sound stream 600 along with a confidence score threshold 630, which is constant (as indicated by a bold straight line in FIG. 6). As illustrated, some of the confidence scores 620 that correspond to the keyword portions 604, 610, and 614 exceed the confidence score threshold 630. In these cases, the voice activation control unit 326 does not determine that the input sound stream 600 does not include the target keyword. The other confidence scores 620 correspond to the non-keyword portions 602 and 606 or the silence portions 608 and 612, and do not exceed the confidence score threshold 630. Thus, the voice activation control unit 326 may determine that the input sound stream 600 corresponding to these scores does not include the target keyword.

The score graph 618 illustrates the current non-keyword scores 640 (as indicated in a black solid line), the current keyword scores 650 (as indicated in a dotted line), the overall average non-keyword scores 660 (as indicated in a black bold solid line). As illustrated in circled portions 670, some of the current non-keyword scores 640 that correspond to the non-keyword portions 602 and 606 or the silence portion 612 exceed the overall average non-keyword score 660 by more than the average non-keyword score threshold. In these cases, the voice activation control unit 326 may determine that the input sound stream 600 corresponding to these scores does not include the target keyword.

Figure 7:
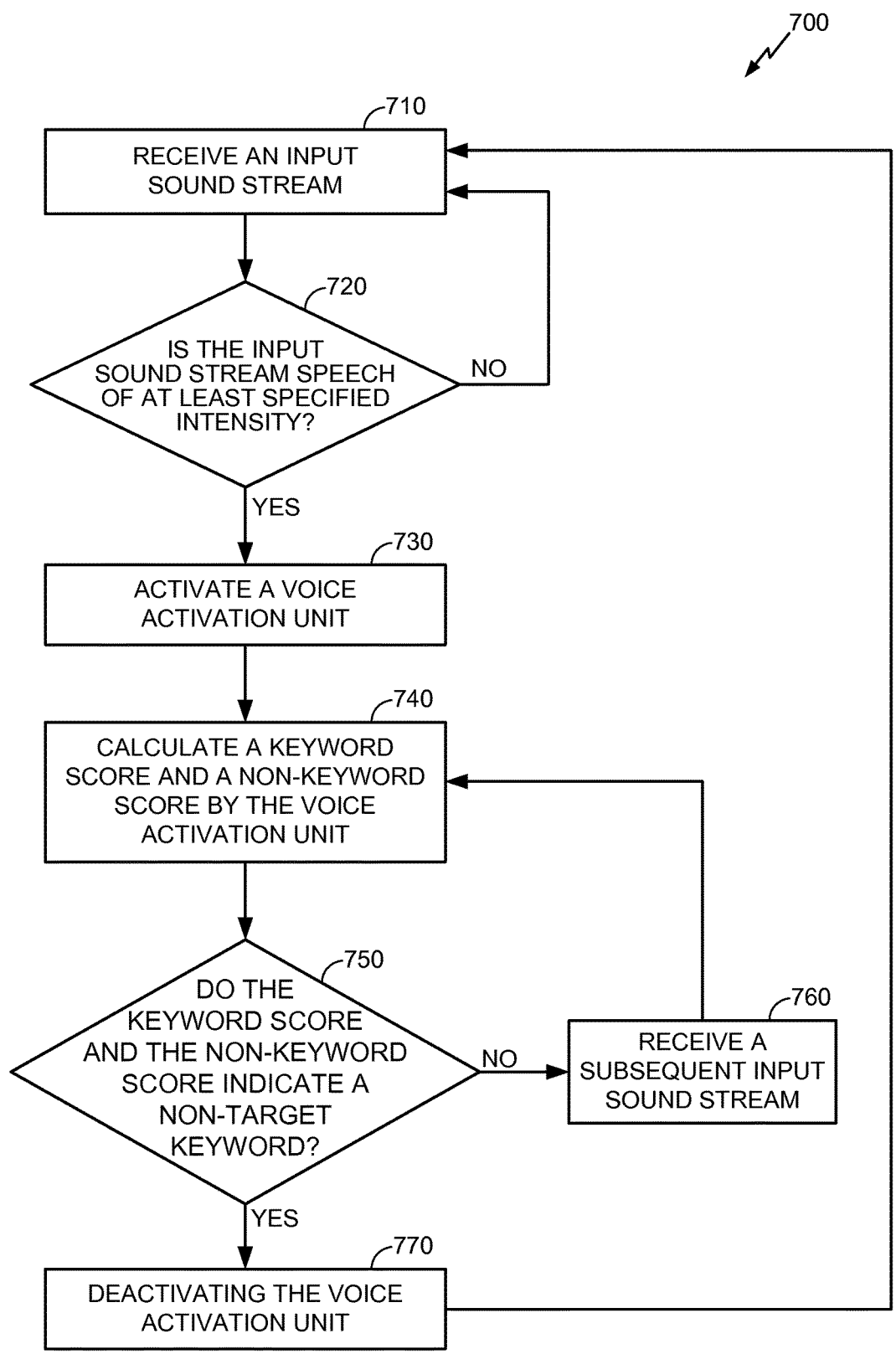
FIG. 7 illustrates a flowchart of a method for deactivating the voice activation unit of the mobile device based on a keyword score and a non-keyword score calculated by the voice activation unit, according to one embodiment of the present disclosure.

FIG. 7 illustrates a flowchart of a method 700 for deactivating the voice activation unit 324 of the mobile device 310 based on a keyword score and a non-keyword score calculated by the voice activation unit 324, according to one embodiment of the present disclosure. The mobile device 310 receives an input sound stream by the sound sensor 312 at 710. Then, the sound detector 314 of the sound sensor 312 and the speech detector 322 determine whether the input sound stream is speech exceeding the threshold sound intensity at 720. If the input sound stream is speech exceeding the threshold sound intensity, the speech detector 322 activates the voice activation unit 324 at 730. However, if the input sound stream is not speech exceeding the threshold sound intensity, the sound detector 314 of the sound sensor 312 and the speech detector 322 receive a subsequent input sound stream again at 710.

At 740, the voice activation unit 324 segments the input sound stream into a plurality of sound frames and extracts a sound feature from each sound frame. After extracting the sound feature, the voice activation unit 324 calculates a keyword score and a non-keyword score from the sound feature and transmits the keyword score and the non-keyword score to the voice activation control unit 326. Based on the keyword score and the non-keyword score calculated by the voice activation unit 324, the voice activation control unit 326 determines whether the keyword score and the non-keyword score indicate a non-target keyword at 750. If the voice activation control unit 326 cannot determines that the keyword score and the non-keyword score indicate the non-target keyword, the voice activation unit 324 receive a subsequent input sound stream at 760. Then, the voice activation unit 324 may calculate a keyword score and non-keyword score for the subsequent input sound stream at 740 until the voice activation unit 324 detects that the keyword score and the non-keyword score indicate the non-target keyword at 750. If the voice activation control unit 326 determines that the keyword score and the non-keyword score indicate the non-target keyword (i.e., the input sound stream indicates the non-target keyword) at 750, the voice activation control unit 326 deactivates the voice activation unit 324 at 770.

Figure 8:
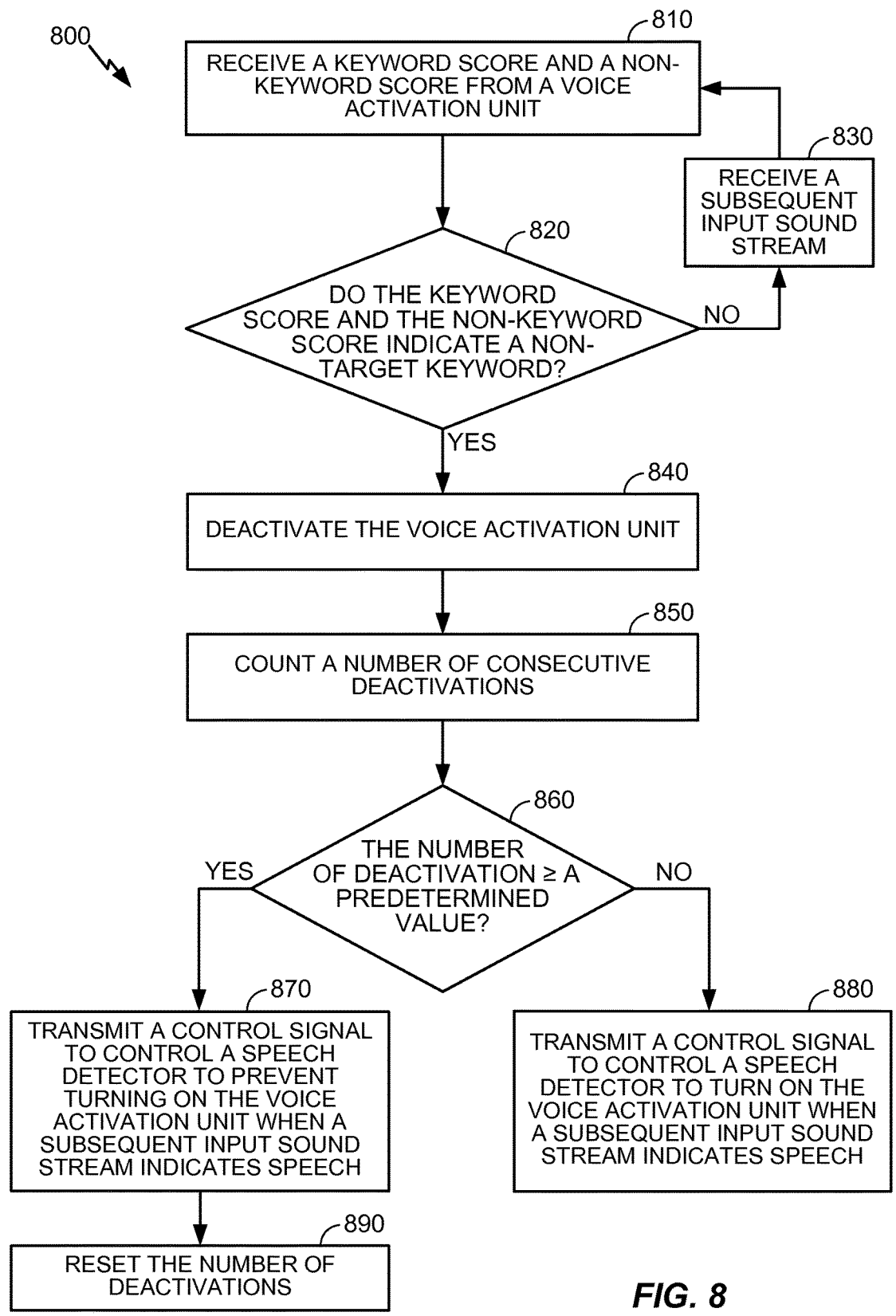
FIG. 8 illustrates a flowchart of a method for deactivating the voice activation unit by the voice activation control unit to terminate receiving and processing the input sound stream that is being received, according to one embodiment of the present disclosure.

FIG. 8 illustrates a flowchart of a method 800 for deactivating the voice activation unit 324 by the voice activation control unit 326 to terminate receiving and processing the input sound stream that is being received, according to one embodiment of the present disclosure. It may be appreciated that the operations at 810 to 840 of the method 800 are performed in the same manner as those at 740 to 770 of the method 700, and thus, a description thereof is omitted. After deactivating the voice activation unit 324 at 840, the voice activation control unit 326 increases a number of deactivations at 850. For example, the mobile device 310 may have a storage unit 318 to store a count value. The initial value of the count value may be set as "0." If the voice activation control unit 326 transmits a deactivation signal to the voice activation unit 324 and the voice activation unit 324 is deactivated, the voice activation control unit 326 may add "1" to the count value.

At 860, the voice activation control unit 326 determines whether the number of deactivations is equal to or exceeds a predetermined value. If the number of deactivation is equal to or exceeds the predetermined value, the voice activation control unit 326 transmits a control signal to control a speech detector 322 to prevent turning on the voice activation unit 324 when a subsequent input sound stream indicates speech at 870. Thus, the voice activation control unit 326 may deactivate the voice activation unit 324 to terminate receiving and processing the input sound stream that is being received. After transmitting the control signal to the speech detector 322, the voice activation control unit 326 resets the number of deactivations at 890. However, if the number of deactivations is less than the predetermined value, the voice activation control unit 326 transmits a control signal to control the speech detector 322 to turn on the voice activation unit 324 when the subsequent input sound stream indicates speech at 880. Thus, after deactivation of the voice activation unit 324, if the speech detector 322 detects speech from the subsequent input sound stream, the speech detector 322 may turn on the voice activation unit 324.

Figure 9:
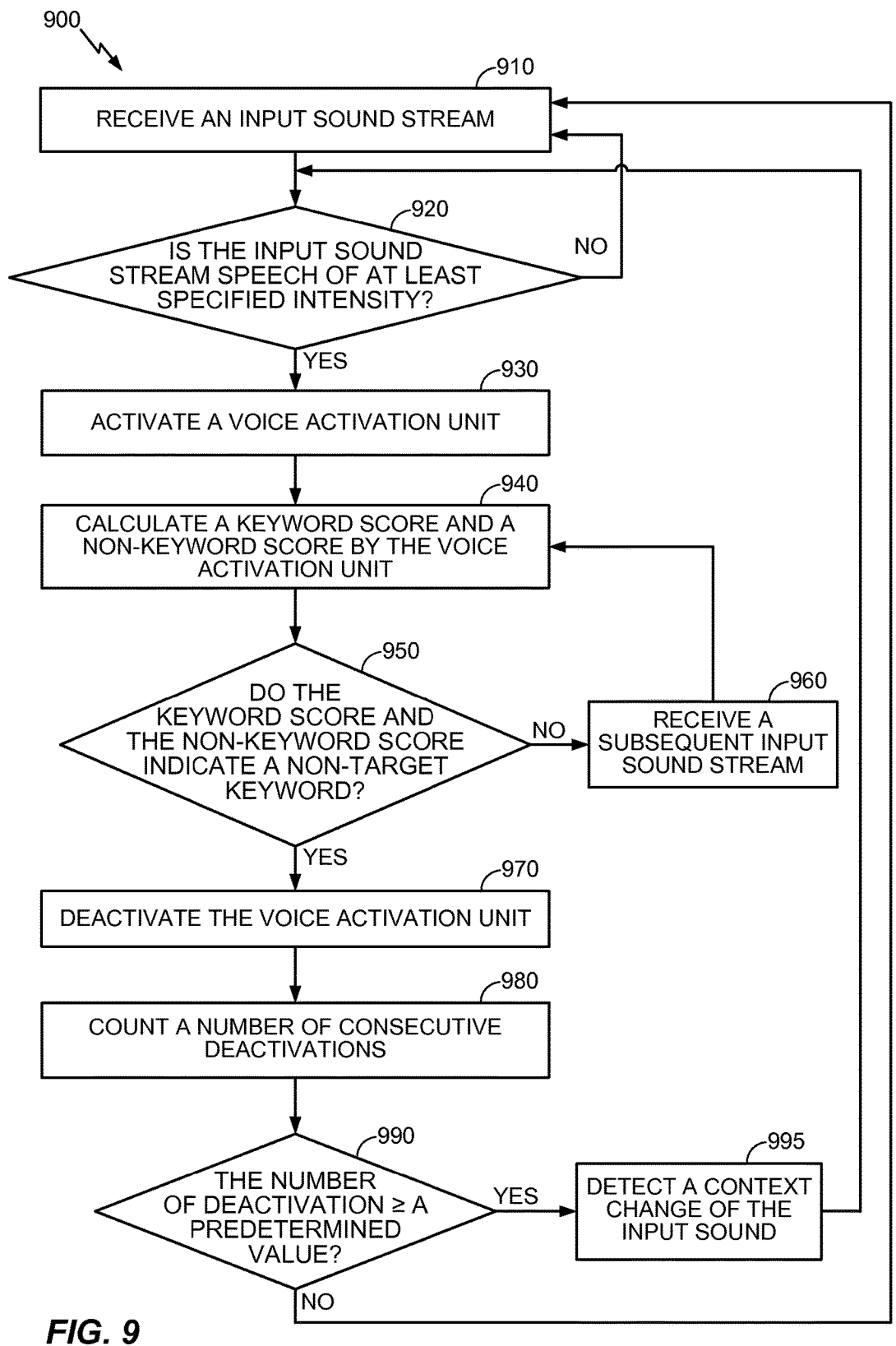
FIG. 9 illustrates a flowchart of a method for reactivating the voice activation unit after deactivating the voice activation unit to terminate receiving and processing the input sound stream that is being received, according to one embodiment of the present disclosure.

FIG. 9 illustrates a flowchart of a method 900 for reactivating the voice activation unit 324 after deactivating the voice activation unit 324 to terminate receiving and processing the input sound stream that is being received, according to one embodiment of the present disclosure. It may be appreciated that the operations at 910 to 970 of the method 900 are performed in the same manner as those at 710 to 770 of the method 700, and thus, a description thereof is omitted. After the voice activation unit 324 has been deactivated at 970, the voice activation control unit 326 counts a number of deactivations at 980. At 990, the voice activation control unit 326 determines whether the number of deactivations is equal to or exceeds a predetermined value. If the number of deactivations is less than the predetermined value, the speech detector 322 receives the subsequent input sound stream at 910. However, if the number of deactivation is equal to or exceeds the predetermined value, the speech detector 322 determines whether a context change between the input sound stream and the subsequent input sound stream is detected at 995. If the context change is detected, the speech detector 322 process the subsequent input sound stream to determine whether the subsequent input sound stream indicates speech.

Figure 10:
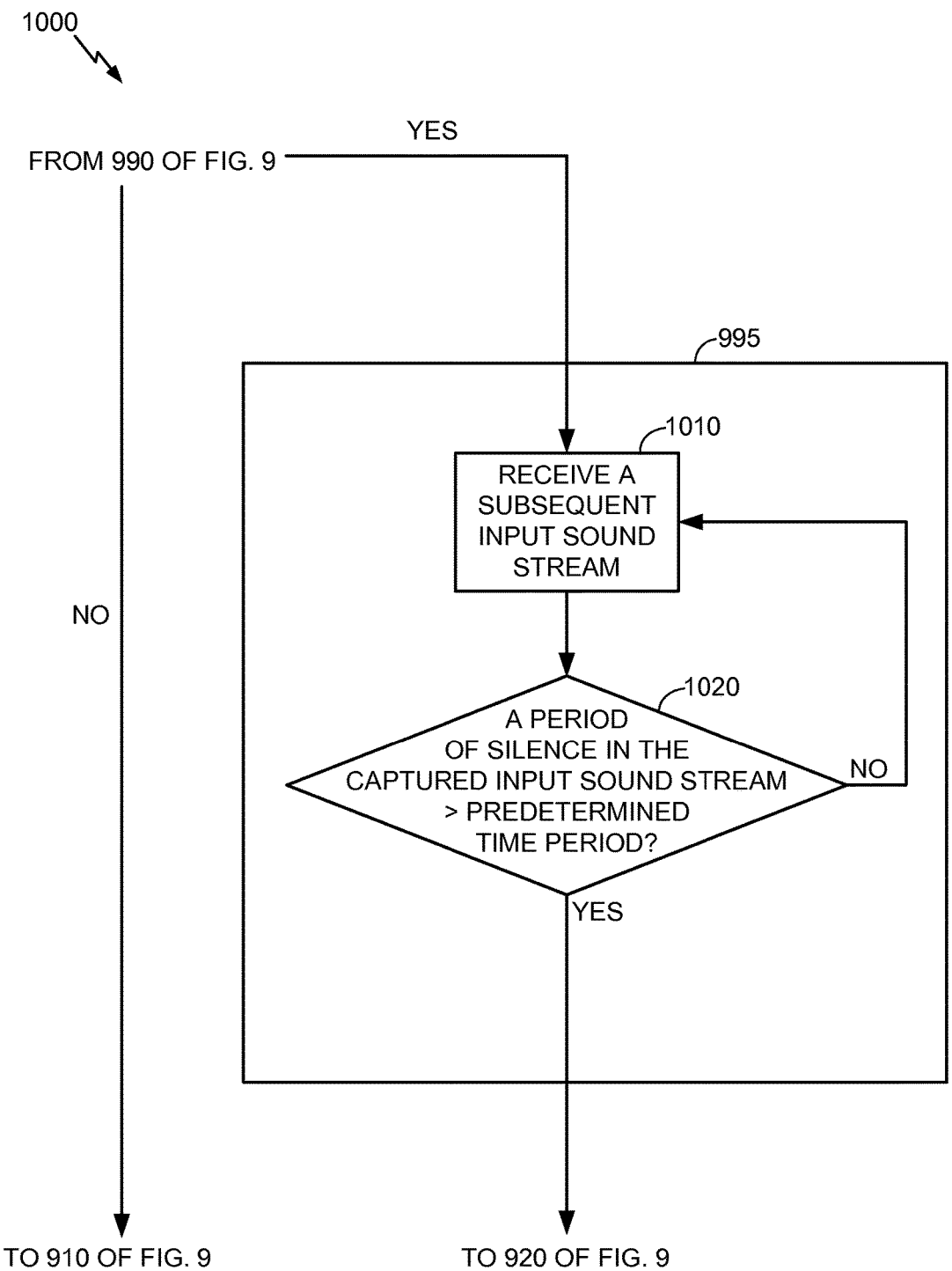
FIG. 10 illustrates a detailed flowchart of a method for detecting a status change of the input sound stream to reactivate the voice activation unit when the number of deactivation is equal to a predetermined value, according to one embodiment of the present disclosure.

FIG. 10 illustrates a detailed flowchart of a method 1000 for detecting a context change of the input sound stream to reactivate the voice activation unit 324 when the number of deactivations is equal to or exceeds a predetermined value, according to one embodiment of the present disclosure. As described above in FIG. 9, the voice activation control unit 326 determines whether the number of deactivations is equal to or exceeds the predetermined value at 990. If the number of deactivations does not exceed the predetermined value, the speech detector 322 receives the subsequent input sound stream at 910. However, if the number of deactivations is equal to or exceeds the predetermined value, the speech detector 322 receives a subsequent input sound stream at 1010. At 1020, the speech detector 322 determines duration of silence between the previously received input sound stream and the subsequent input sound stream. If the duration of silence is not greater than a predetermined time period, the speech detector 322 receives a subsequent input sound stream repeatedly. However, if the duration of silence is greater than the predetermined time period (i.e., context change of the input sound is detected), the speech detector 322 determine whether the received subsequent input sound is speech for the subsequent input sound stream at 920.

Figure 11:
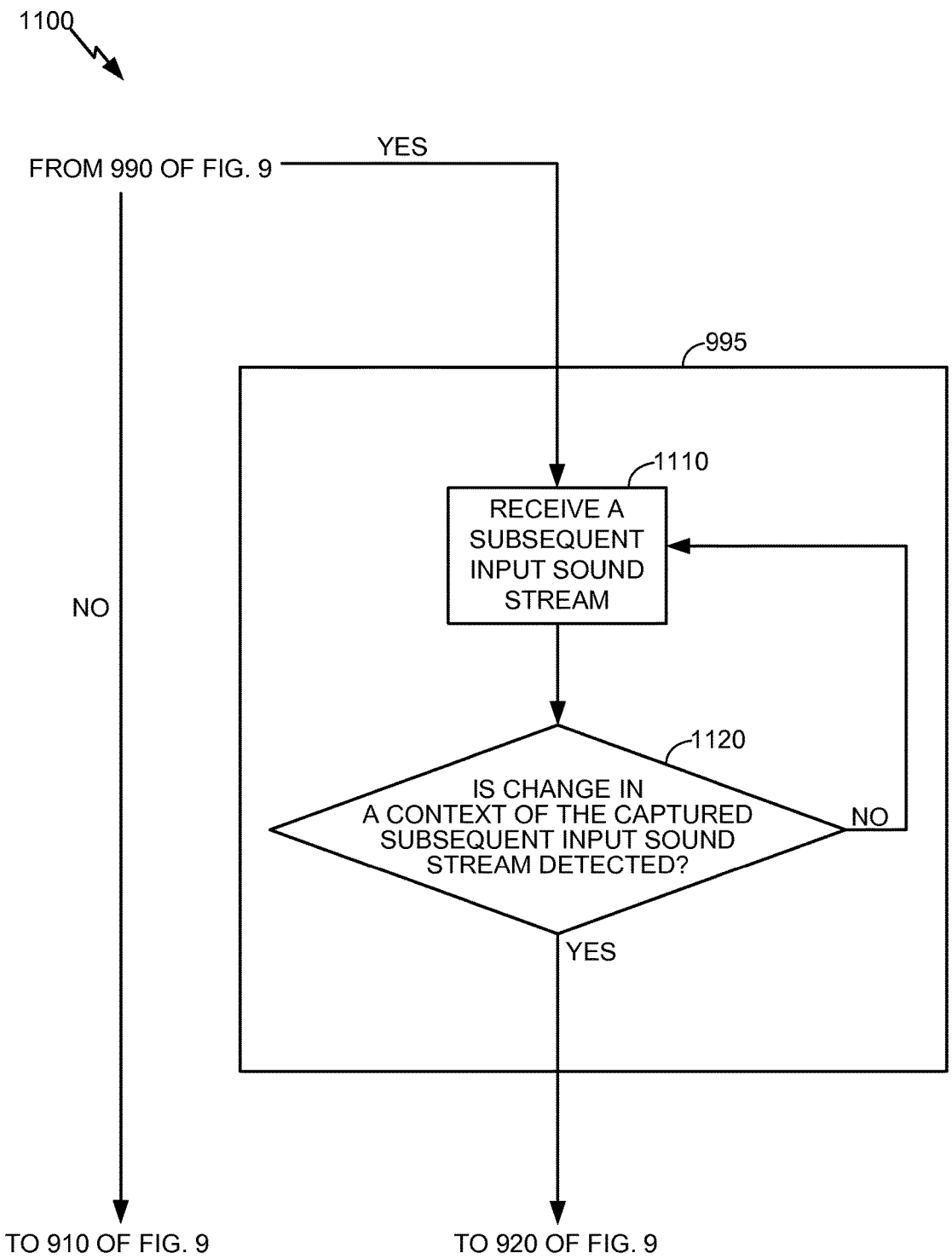
FIG. 11 illustrates a detailed flowchart of a method for detecting a status change of the input sound to reactivate the voice activation unit when the number of deactivation is equal to a predetermined value, according to another embodiment of the present disclosure.

FIG. 11 illustrates a detailed flowchart of a method 1100 for detecting a context change of the input sound to reactivate the voice activation unit 324 when the number of deactivations is equal to or exceeds a predetermined value, according to another embodiment of the present disclosure. As described above in FIG. 9, the voice activation control unit 326 determines whether the number of deactivations is equal to or exceeds the predetermined value at 990. If the number of deactivations does not exceed the predetermined value, the speech detector 322 receives the subsequent input sound stream at 910. However, if the number of deactivations is equal to or exceeds the predetermined value, the speech detector 322 receives a subsequent input sound stream at 1110. At 1120, the speech detector 322 detects a change in a context of the captured subsequent input sound stream. If the change in the context is not detected, the speech detector 322 may receive a subsequent input sound stream repeatedly. However, if the change in the context is detected (i.e., context change of the input sound is detected), the speech detector 322 determine whether the received subsequent input sound is speech for the subsequent input sound stream at 920.

Figure 12A:
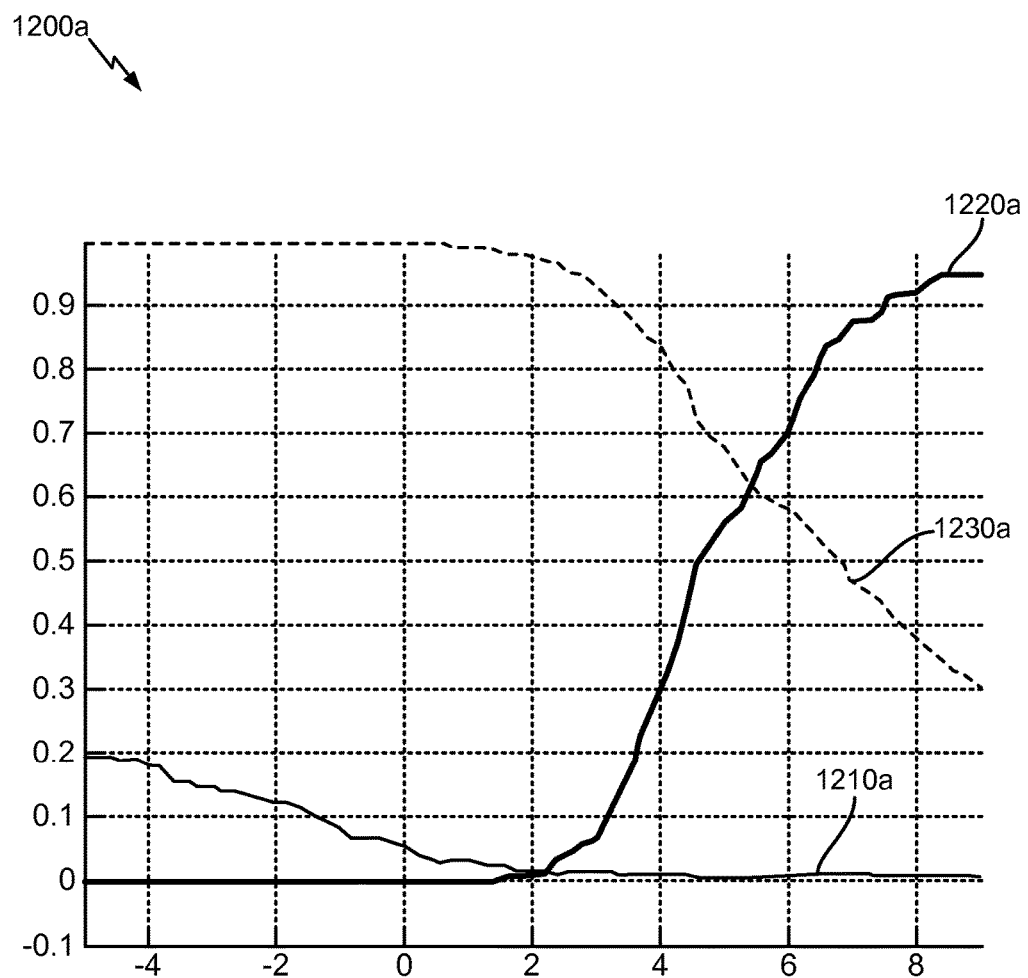
FIG. 12A illustrates a graph showing a plurality of lines from a simulation for use in determining an average non-keyword score threshold, according to one embodiment of the present disclosure.

FIG. 12A illustrates a graph 1200a showing a plurality of lines 1210a, 1220a, and 1230a from a simulation for use in determining an average non-keyword score threshold, according to one embodiment of the present disclosure. In this embodiment, the simulation is performed with an input sound stream without noise. The x-axis of the graph 1200a represents the average non-keyword score threshold while the y-axis represents the probability for the lines 1210a, 1220a, and 1230a as a function of the average non-keyword score threshold. The line 1210a indicates a probability of a "false alarm" that the voice activation control unit 326 erroneously determines that the input sound stream does not include the target keyword when the input sound stream in fact includes the target keyword.

A false alarm is undesirable because it may require repeated input of the target keyword by a user. Thus, it may be desirable to set the probability of the false alarm to be near zero. In the false alarm line 1210*a*, the probability of the false alarm approaches near zero when the average non-keyword score threshold is greater than "2." Accordingly, the average non-keyword score threshold in the voice activation control unit 326 may be set to a value of "2" or greater.

The line 1220*a* indicates a probability of a "miss" that the voice activation control unit 326 erroneously determines that the input sound stream includes the target keyword when the input sound stream does not in fact include the target keyword. On the other hand, the line 1230*a* indicates a probability of correctly detecting a non-keyword by the voice activation control unit 326 when the input sound stream does not include the target keyword. As shown, the "miss" line 1220*a* shows that the probability of a "miss" is initially flat near zero but increases significant after the average non-keyword score threshold value of "2." In contrast, the line 1230*a* indicates that the probability of correctly detecting a non-keyword is near the probability value of "1," but begins to decrease substantially when the average non-keyword score reaches a value of "2." Considering the lines 1210*a*, 1220*a*, and 1230*a*, the average non-keyword score threshold may be set between "2" and "3" for an optimum performance.

Figure 12B:
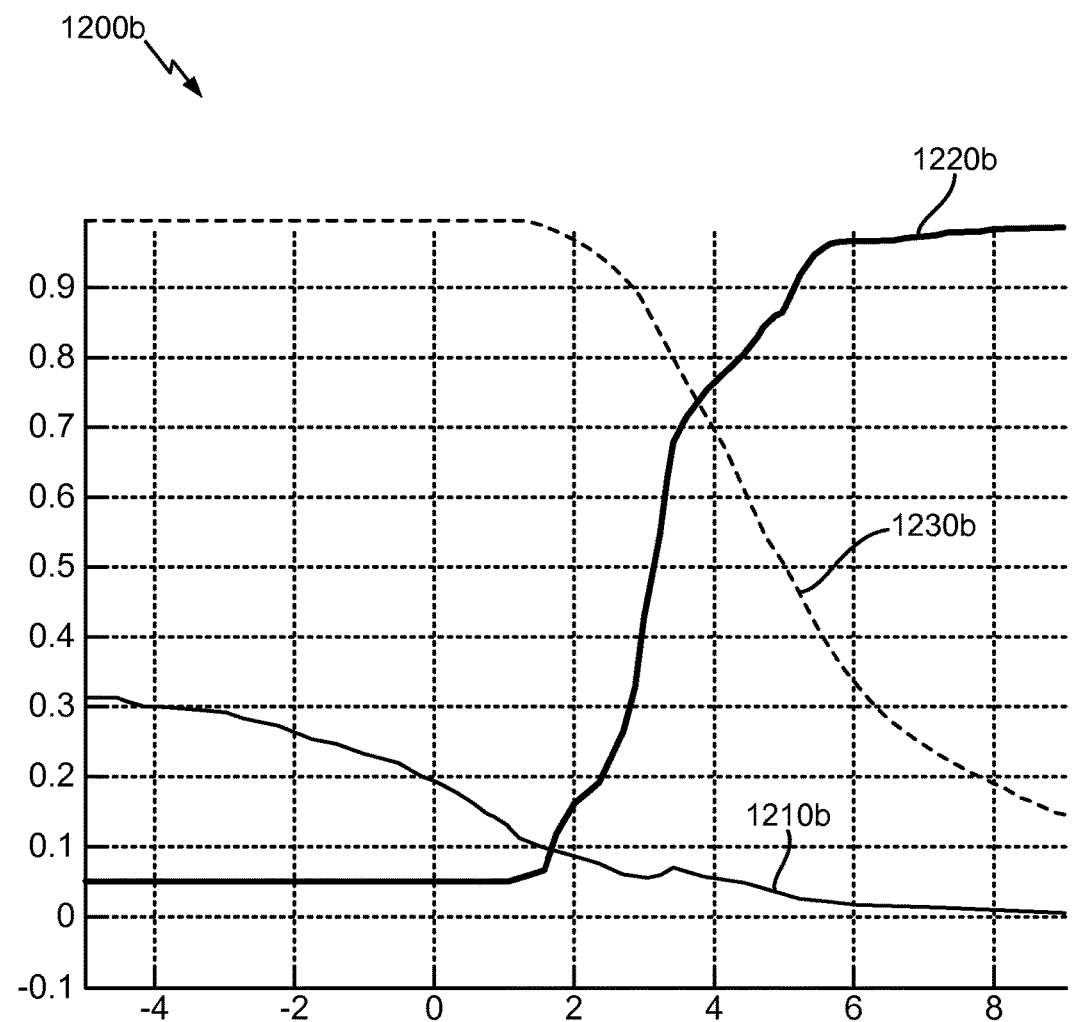
FIG. 12B illustrates a graph showing a plurality of lines from a simulation for use in determining an average non-keyword score threshold, according to another embodiment of the present disclosure.

FIG. 12B illustrates a graph 1200*b* showing a plurality of lines 1210*b*, 1220*b*, and 1230*b* from a simulation for use in determining an average non-keyword score threshold, according to another embodiment of the present disclosure. In this embodiment, the simulation is performed with an input sound stream having noise. Similarly to FIG. 12A, the line 1210*b* indicates a probability of a "false alarm" that the voice activation control unit 326 erroneously determines that the input sound stream does not include the target keyword when the input sound stream in fact includes the target keyword. Further, the line 1220*b* indicates a probability of a "miss" that the voice activation control unit 326 erroneously determines that the input sound stream includes the target keyword when the input sound stream does not in fact include the target keyword. On the other hand, the line 1230*b* indicates a probability of correctly detecting a non-keyword by the voice activation control unit 326 when the input sound stream does not include the target keyword. As shown, the false alarm line 1210*b* approaches near zero when the average non-keyword score threshold is greater than "3." In addition, the "miss" line 1220*b* shows that the probability of a "miss" is initially flat near zero but increases significant after the average non-keyword score threshold value of "2." In contrast, the line 1230*b* indicates that the probability of correctly detecting a non-keyword is near the probability value of "1," but begins to decrease substantially when the average non-keyword score threshold reaches a value of "2." Considering the lines 1210*b*, 1220*b*, and 1230*b*, the average non-keyword score threshold may be set between "3" and "4" for an optimum performance (i.e., for reducing the probability of the false alarm). As described above, the average non-keyword score threshold may be adjusted based on context information (e.g., noisy context) of a mobile device.

Figure 13:
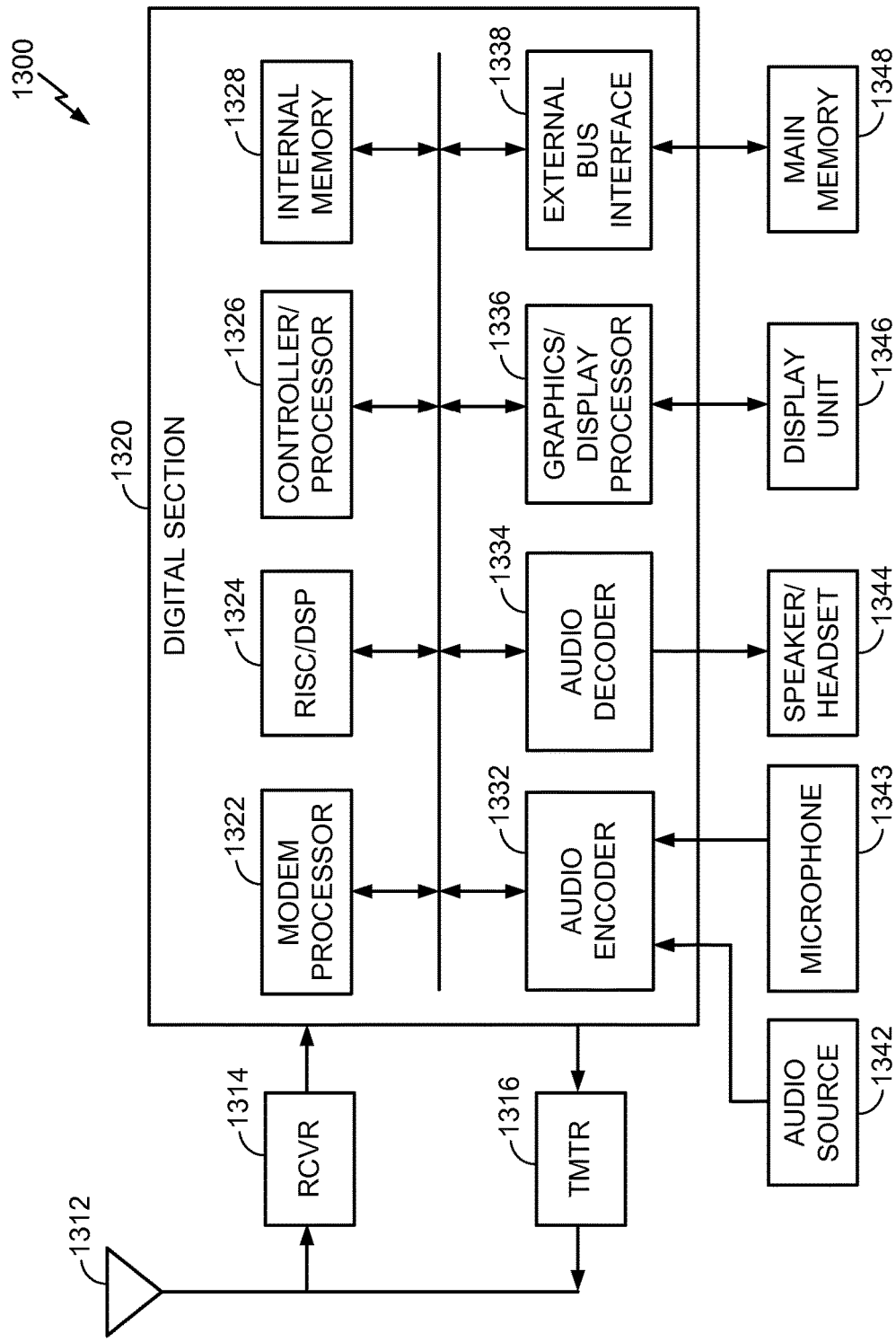
FIG. 13 is a block diagram of an exemplary mobile device having a wireless communication capability, according to one embodiment of the present disclosure.

FIG. 13 is a block diagram of an exemplary mobile device 1300 having a wireless communication capability, according to one embodiment of the present disclosure. The mobile device 1300 may be a cellular phone, a terminal, a handset, a personal digital assistant (PDA), a wireless modem, a cordless phone, and so on. The wireless communication system may be a Code Division Multiple Access (CDMA) system, a Global System for Mobile Communications (GSM) system, a Wideband CDMA (W-CDMA) system, a Long Term Evolution (LTE) system, a LTE Advanced system, and so on.

The mobile device 1300 may be capable of providing bidirectional communication via a receive path and a transmit path. On the receive path, signals transmitted by base stations are received by an antenna 1312 and are provided to a receiver (RCVR) 1314. The receiver 1314 conditions and digitizes the received signal and provides the conditioned and digitized signal to a digital section 1320 for further processing. On the transmit path, a transmitter (TMTR) receives data to be transmitted from a digital section 1320, processes and conditions the data, and generates a modulated signal, which is transmitted via the antenna 1312 to the base stations. The receiver 1314 and the transmitter 1316 are part of a transceiver that supports CDMA, GSM, W-CDMA, LTE, LTE Advanced, and so on.

The digital section 1320 includes various processing, interface, and memory units such as, for example, a modem processor 1322, a reduced instruction set computer/digital signal processor (RISC/DSP) 1324, a controller/processor 1326, an internal memory 1328, a generalized audio encoder 1332, a generalized audio decoder 1334, a graphics/display processor 1336, and/or an external bus interface (EBI) 1338. The modem processor 1322 performs processing for data transmission and reception, e.g., encoding, modulation, demodulation, and decoding. The RISC/DSP 1324 performs general and specialized processing for the wireless device 1300. The controller/processor 1326 controls the operation of various processing and interface units within the digital section 1320. The internal memory 1328 stores data and/or instructions for various units within the digital section 1320.

The generalized audio encoder 1332 performs encoding for input signals from an audio source 1342, a microphone 1343, and so on. The generalized audio decoder 1334 performs decoding for coded audio data and provides output signals to a speaker/headset 1344. It should be noted that the generalized audio encoder 1332 and the generalized audio decoder 1334 are not necessarily required for interface with the audio source, the microphone 1343, and the speaker/headset 1344, and thus are not shown in the mobile device 1300. The graphics/display processor 1336 performs processing for graphics, videos, images, and text, which is presented to a display unit 1346. The EBI 1338 facilitates the transfer of data between the digital section 1320 and a main memory 1348.

The digital section 1320 is implemented with one or more processors, DSPs, microprocessors, RISCs, etc. The digital section 1320 is also fabricated on one or more application specific integrated circuits (ASICs) and/or some other type of integrated circuits (ICs).

In general, any device described herein is indicative of various types of devices, such as a wireless phone, a cellular phone, a laptop computer, a wireless multimedia device, a wireless communication personal computer (PC) card, a PDA, an external or internal modem, a device that communicates through a wireless channel, and so on. A device may have various names, such as an access terminal (AT), access unit, subscriber unit, mobile station, client device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein are implemented by various means. For example, these techniques are implemented in hardware, firmware, software, or combinations thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For hardware implementation, the processing units used to perform the techniques are implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for controlling voice activation by a target keyword in a device, the method comprising:
   receiving an input sound stream while speech detection and voice activation are deactivated at the device;
   based on receiving the input sound stream and without determining whether the input sound stream satisfies an intensity threshold, activating the speech detection at the device to determine, based on a first extraction performed on the input sound stream to obtain a plurality of features and based on a sound classification technique, whether the input sound stream represents speech;
   based on the speech detection determining that the input sound stream represents speech and prior to determining whether the input sound stream indicates the target keyword, activating the voice activation to:
      determine, based on a second extraction performed on the input sound stream to obtain at least one sound feature and based on a second technique different from the sound classification technique, whether the at least one sound feature indicates the target keyword; and
   in response to the at least one sound feature indicating a non-target keyword and based on an average of non-keyword scores for a first period of time and a second average of non-keyword scores for a second period of time, the second period of time longer than the first period of time, deactivating the voice activation.

2. The method of claim 1, wherein the second technique includes a pattern recognition or probability technique, and further comprising:
   determining a first metric corresponding to a non-target keyword status of the at least one sound feature; and
   comparing the first metric to a second metric that is based on the input sound stream, wherein the at least one sound feature is determined to indicate the non-target keyword based on a result of the comparison.

3. The method of claim 2, wherein the second metric corresponds to a target keyword status of the at least one sound feature.

4. The method of claim 2, wherein the second metric is associated with an average non-target keyword status during a time period.

5. The method of claim 1, wherein the speech detection and the voice activation are performed within the device, and wherein the device comprises a mobile device.

6. The method of claim 1, wherein the speech detection and the voice activation are performed within the device, and wherein the device comprises a fixed location communication device.

7. The method of claim 1, further comprising determining a keyword score and a non-keyword score based on the at least one sound feature, and wherein deactivating the voice activation includes deactivating the voice activation when the non-keyword score exceeds the keyword score by more than a score threshold.

8. The method of claim 1, wherein the voice activation is deactivated in response to the average being greater than the second average by more than a score threshold, and further comprising adjusting the score threshold based on context information of the device.

9. The method of claim 1, further comprising:
reactivating the voice activation when a subsequent input sound stream received after deactivating the voice activation represents speech; and
deactivating the voice activation when at least one sound feature extracted from the subsequent input sound stream indicates the non-target keyword.

10. The method of claim 9, further comprising counting a number of times that the voice activation is deactivated and, when the number of times that the voice activation is deactivated is less than a particular number, reactivating the voice activation.

11. The method of claim 10, further comprising:
determining a duration of silence in the received input sound stream when the number of times that the voice activation is deactivated is greater than or equal to the particular number; and
reactivating the voice activation when the duration of silence exceeds a particular time period.

12. The method of claim 10, further comprising:
detecting a change in a context of the received input sound stream when the number of times that the voice activation is deactivated is greater than or equal to the particular number; and
reactivating the voice activation when the change in the context of the received input sound stream is detected.

13. The method of claim 10, further comprising deactivating receiving the input sound stream for a particular time period when the number of times that the voice activation is deactivated is greater than or equal to the particular number.

14. A method for controlling voice activation by a target keyword in a device, the method comprising:
receiving an input sound stream while speech detection and voice activation are deactivated at the device;
in response to receiving the input sound stream and without determining whether the input sound stream satisfies an intensity threshold, activating the speech detection at the device to:
obtain a plurality of features based on a first extraction performed on the input sound stream; and
determine, based on the plurality of features and based on a sound classification technique, whether the input sound stream represents speech, wherein determining whether the input sound stream represents speech is performed while the device is in an idle mode;
in response to the speech detection determining that the input sound stream represents speech and prior to determining whether the input sound stream indicates the target keyword, activating the voice activation to:
obtain at least one sound feature based on a second extraction performed on the input sound stream; and
determine, based on the at least one sound feature and based on a second technique different from the sound classification technique, whether the at least one sound feature indicates the target keyword; and
deactivating the voice activation in response to the at least one sound feature indicating a non-target keyword and based on an average of non-keyword scores for a first period of time and a second average of non-keyword scores for a second period of time, the second period of time longer than the first period of time.

15. The method of claim 14, wherein determining whether the at least one sound feature indicates the target keyword is based on a pattern recognition or probability technique, and further comprising deactivating the speech detection for a particular time period when a number of times that the voice activation is deactivated is greater than or equal to a particular number.

16. The method of claim 14, wherein the voice activation is performed by a voice activation unit configured to activate at least one application in the device, and further comprising resetting a number of times that the voice activation is deactivated in response to the number of times that the voice activation is deactivated remaining unchanged for a particular time.

17. A device for controlling voice activation by a target keyword, the device comprising:
a receiver configured to receive an input sound stream while a speech detector and voice activation unit are deactivated at the device and to, in response to receiving the input sound stream and without determining whether the input sound stream satisfies an intensity threshold, activate the speech detector;
the speech detector configured to:
obtain a plurality of features based on a first extraction performed on the input sound stream;
determine, based on the plurality of features and based on a sound classification technique, whether the input sound stream represents speech; and
in response to the input sound stream representing speech and prior to detecting the target keyword, activate the voice activation unit;
the voice activation unit configured to:
obtain at least one sound feature based on a second extraction performed on the input sound stream; and
detect the target keyword based on the at least one sound feature and based on a second technique different from the sound classification technique; and
a voice activation control unit configured to deactivate the voice activation unit in response to the at least one sound feature indicating a non-target keyword and based on an average of non-keyword scores for a first period of time and a second average of non-keyword scores for a second period of time, the second period of time longer than the first period of time.

18. The device of claim 17, wherein the second technique includes a pattern recognition or probability technique, and wherein the voice activation unit is further configured to determine a keyword score and a non-keyword score based on the at least one sound feature.

19. The device of claim 17, wherein the speech detector is configured to determine whether the input sound stream represents speech while the device is in an idle mode, and wherein the voice activation control unit is configured to deactivate the voice activation unit when a determined non-keyword score exceeds a determined keyword score by more than a score threshold.

20. The device of claim 17, wherein the voice activation control unit is configured to deactivate the voice activation unit based on a first average of non-keyword scores for a first period of time and a second average of non-keyword scores for a second period of time.

21. The device of claim 17, wherein determining whether the input sound stream represents speech is performed while the device is in an idle mode.

22. The device of claim 17, further comprising an antenna coupled to the receiver, wherein the speech detector, the voice activation unit, the voice activation control unit, the receiver, and the antenna are integrated into a mobile device.

23. The device of claim 17, comprising an antenna coupled to the receiver, wherein the speech detector, the voice activation unit, the voice activation control unit, the receiver, and the antenna are integrated into a fixed location communication device.

24. A non-transitory computer-readable storage medium storing instructions for controlling voice activation by a target keyword in a device, the instructions causing a processor to perform operations, the operations comprising:
receiving an input sound stream while speech detection and voice activation are deactivated at the device;
in response to receiving the input sound stream and without determining whether the input sound stream satisfies an intensity threshold, activating the speech detection at the device to:
obtain a plurality of features based on a first extraction performed on the input sound stream; and determine, based on the plurality of features and based on a sound classification technique, whether the input sound stream represents speech;
in response to the speech detection determining that the input sound stream represents speech and prior to determining whether at least one sound feature indicates the target keyword, activating the voice activation to:
obtain the at least one sound feature based on a second extraction performed on the input sound stream; and
determine, based on the at least one sound feature and based on a second technique different from the sound classification technique, whether the at least one sound feature indicates the target keyword; and
in response to the at least one sound feature indicating a non-target keyword and based on an average of non-keyword scores for a first period of time and a second average of non-keyword scores for a second period of time, the second period of time longer than the first period of time, deactivating the voice activation.

25. The non-transitory computer-readable storage medium of claim 24, wherein the determination of whether the input sound stream represents speech is made while the device is in an idle mode, and wherein the operations further comprise:

determining a first metric corresponding to a non-target keyword status of the at least one sound feature; and
comparing the first metric to a second metric that is based on the input sound stream, wherein the at least one sound feature is determined to indicate the non-target keyword based on a result of the comparison.

26. The non-transitory computer-readable storage medium of claim 25, wherein the second metric corresponds to a target keyword status of the at least one sound feature.

27. A device for controlling voice activation by a target keyword, the device comprising:
means for detecting speech;
means for performing voice activation; and
means for receiving an input sound stream while the means for detecting speech and the means for performing voice activation are deactivated at the device, the means for receiving configured to, in response to receiving the input sound stream and without determining whether the input sound stream satisfies an intensity threshold, activate the means for detecting speech,
the means for detecting speech configured to:
obtain a plurality of features based on a first extraction performed on the input sound stream;
determine, based on the plurality of features and based on a sound classification technique, whether the input sound stream represents speech; and
activate the means for performing voice activation in response to the input sound stream representing speech and prior to determining whether the input sound stream indicates the target keyword;
the means for performing voice activation configured to:
obtain at least one sound feature based on a second extraction performed on the input sound stream; and
determine, based on the at least one sound feature and based on a second technique different from the sound classification technique, whether the at least one sound feature indicates the target keyword; and
means for deactivating the means for performing voice activation in response to the at least one sound feature indicating a non-target keyword and based on an average of non-keyword scores for a first period of time and a second average of non-keyword scores for a second period of time, the second period of time longer than the first period of time.

28. The device of claim 27, wherein the determination of whether the input sound stream represents speech is performed while the device is in an idle mode, and wherein the means for performing voice activation comprises means for determining a keyword score and a non-keyword score from the at least one sound feature.

29. The device of claim 27, wherein the second technique includes a pattern recognition or probability technique, and wherein the means for detecting speech, the means for performing voice activation, the means for receiving, and the means for deactivating are integrated into a mobile device.

30. The device of claim 27, wherein the means for detecting speech, the means for performing voice activation, the means for receiving, and the means for deactivating are integrated into a fixed location communication device.

* * * * *